United States Patent
Moriya et al.

(10) Patent No.: US 8,498,499 B2
(45) Date of Patent: Jul. 30, 2013

(54) IMAGE PROCESSING APPARATUS AND METHOD AND IMAGE DISPLAY APPARATUS

(75) Inventors: Shotaro Moriya, Tokyo (JP); Noritaka Okuda, Tokyo (JP); Satoshi Yamanaka, Tokyo (JP); Koji Minami, Tokyo (JP); Hironobu Yasui, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 296 days.

(21) Appl. No.: 13/056,540

(22) PCT Filed: Jul. 15, 2009

(86) PCT No.: PCT/JP2009/003330
§ 371 (c)(1),
(2), (4) Date: Jan. 28, 2011

(87) PCT Pub. No.: WO2010/013401
PCT Pub. Date: Feb. 4, 2010

(65) Prior Publication Data
US 2011/0211766 A1    Sep. 1, 2011

(30) Foreign Application Priority Data

Jul. 30, 2008  (JP) ................. 2008-196277
Oct. 21, 2008  (JP) ................. 2008-271123
Feb. 23, 2009  (JP) ................. 2009-039273

(51) Int. Cl.
*G06K 9/36*    (2006.01)

(52) U.S. Cl.
USPC ........... 382/284; 382/260; 382/274; 382/275; 358/3.26; 358/3.27; 358/643

(58) Field of Classification Search
USPC ......... 382/260, 274, 275, 282, 284; 358/3.26, 358/3.27, 463
See application file for complete search history.

(56) References Cited

U.S. PATENT DOCUMENTS 5,717,789 A    2/1998  Anderson et al.
5,912,702 A    6/1999  Sudo
(Continued)

FOREIGN PATENT DOCUMENTS

JP    5-83602 A     4/1993
JP    5-344386 A    12/1993
(Continued)

OTHER PUBLICATIONS

Shimura et al., "A Digital Image Enlarging Method without Edge Effect by Using the ε-Filter," Technical Report of IEICE, vol. J86-A, No. 5, May 2003, pp. 540-551.

(Continued)

*Primary Examiner* — Yosef Kassa
(74) *Attorney, Agent, or Firm* — Birch, Stewart, Kolasch & Birch, LLP

(57) ABSTRACT

There are provided a first intermediate image generating means (1) for generating a first intermediate image (D1) by extracting a component in a vicinity of a particular frequency band in an input image (DIN), a second intermediate image generating means (2) for generating a second intermediate image (D2) from the first intermediate image (D1), and an adding means for adding the input image (DIN) and the second intermediate image (D2). The second intermediate image generating means (2) includes a non-linear processing means (2A) that varies the content of its processing according to the pixel in the intermediate image (D1). Even if the input image includes a fold-over component on the high-frequency side or does not include an adequate high-frequency component, adequate image enhancement processing can be carried out.

14 Claims, 31 Drawing Sheets

U.S. PATENT DOCUMENTS

| | | | |
|---|---|---|---|
| 6,005,983 A | 12/1999 | Anderson et al. | |
| 6,611,627 B1* | 8/2003 | LaRossa et al. | 382/240 |
| 6,724,942 B1* | 4/2004 | Arai | 382/254 |
| 6,735,337 B2* | 5/2004 | Lee et al. | 382/220 |
| 6,807,316 B2* | 10/2004 | Enomoto | 382/264 |
| 7,006,686 B2* | 2/2006 | Hunter et al. | 382/162 |
| 7,215,821 B2* | 5/2007 | Schuhrke et al. | 382/254 |
| 7,332,909 B2* | 2/2008 | Schaffter et al. | 324/309 |
| 7,382,406 B2* | 6/2008 | Higuchi | 348/241 |
| 7,426,314 B2* | 9/2008 | Kimbell et al. | 382/260 |
| 7,456,873 B2* | 11/2008 | Kohashi et al. | 348/235 |
| 7,538,822 B2* | 5/2009 | Lee et al. | 348/606 |
| 7,668,389 B2* | 2/2010 | Kitamura et al. | 382/255 |
| 2002/0067414 A1 | 6/2002 | Tanji et al. | |
| 2002/0126911 A1 | 9/2002 | Gindele et al. | |
| 2006/0215796 A1 | 9/2006 | Lin | |

FOREIGN PATENT DOCUMENTS

| | | |
|---|---|---|
| JP | 7-177386 A | 7/1995 |
| JP | 7-274035 A | 10/1995 |
| JP | 8-98154 A | 4/1996 |
| JP | 9-44651 A | 2/1997 |
| JP | 9-46554 A | 2/1997 |
| JP | 9-224186 A | 8/1997 |
| JP | 2002-269558 A | 9/2002 |
| JP | 2003-304506 A | 10/2003 |
| JP | 2006-252508 A | 9/2006 |
| JP | 2007-104446 A | 4/2007 |

OTHER PUBLICATIONS

Greenspan et al., "Image enhancement by non-linear extrapolation in frequency space", Proceedings of the IS & T/SPIE Symposium on Electronic Imaging Science and Technology—Image and Video Processing II, vol. 2182, pp. 2-13, Feb. 1994.

Greenspan et al.,"Image Enhancement by Nonlinear Extrapolation in Frequency Space", IEEE Transactions on Image Processing, vol. 9, No. 6, pp. 1035-1048, Jun. 2000.

* cited by examiner

FIG.8(A)

| A11 | A21 | A31 | A41 |
|-----|-----|-----|-----|
| A12 | A22 | A32 | A42 |
| A13 | A23 | A33 | A43 |
| A14 | A24 | A34 | A44 |

FIG.8(B)

| A11 | 0 | A21 | 0 | A31 | 0 | A41 | 0 |
|-----|---|-----|---|-----|---|-----|---|
| A12 | 0 | A22 | 0 | A32 | 0 | A42 | 0 |
| A13 | 0 | A23 | 0 | A33 | 0 | A43 | 0 |
| A14 | 0 | A24 | 0 | A34 | 0 | A44 | 0 |

FIG.8(C)

| B11 | B21 | B31 | B41 | B51 | B61 | B71 | B81 |
|-----|-----|-----|-----|-----|-----|-----|-----|
| B12 | B22 | B32 | B42 | B52 | B62 | B72 | B82 |
| B13 | B23 | B33 | B43 | B53 | B63 | B73 | B83 |
| B14 | B24 | B34 | B44 | B54 | B64 | B74 | B84 |

FIG.8(D)

| B11 | B21 | B31 | B41 | B51 | B61 | B71 | B81 |
|-----|-----|-----|-----|-----|-----|-----|-----|
| 0   | 0   | 0   | 0   | 0   | 0   | 0   | 0   |
| B12 | B22 | B32 | B42 | B52 | B62 | B72 | B82 |
| 0   | 0   | 0   | 0   | 0   | 0   | 0   | 0   |
| B13 | B23 | B33 | B43 | B53 | B63 | B73 | B83 |
| 0   | 0   | 0   | 0   | 0   | 0   | 0   | 0   |
| B14 | B24 | B34 | B44 | B54 | B64 | B74 | B84 |
| 0   | 0   | 0   | 0   | 0   | 0   | 0   | 0   |

FIG.8(E)

| C11 | C21 | C31 | C41 | C51 | C61 | C71 | C81 |
|-----|-----|-----|-----|-----|-----|-----|-----|
| C12 | C22 | C32 | C42 | C52 | C62 | C72 | C82 |
| C13 | C23 | C33 | C43 | C53 | C63 | C73 | C83 |
| C14 | C24 | C34 | C44 | C54 | C64 | C74 | C84 |
| C15 | C25 | C35 | C45 | C55 | C65 | C75 | C85 |
| C16 | C26 | C36 | C46 | C56 | C66 | C76 | C86 |
| C17 | C27 | C37 | C47 | C57 | C67 | C77 | C87 |
| C18 | C28 | C38 | C48 | C58 | C68 | C78 | C88 |

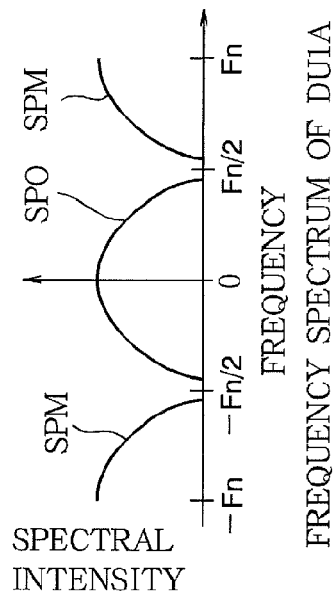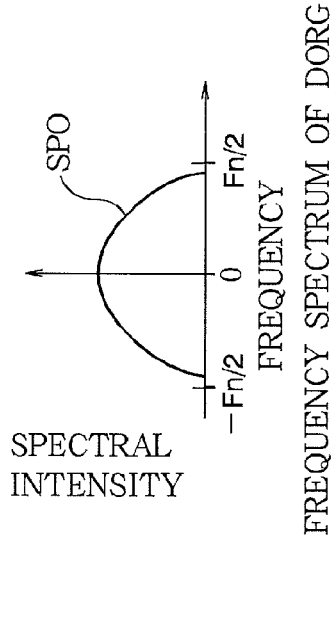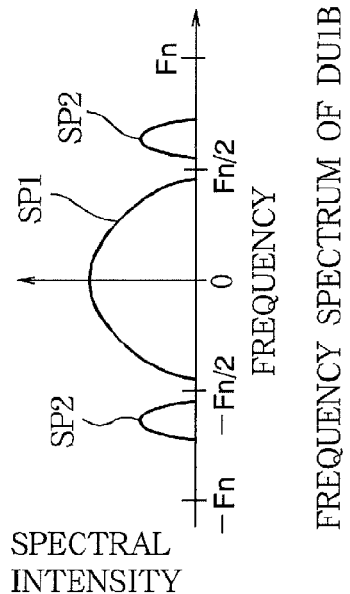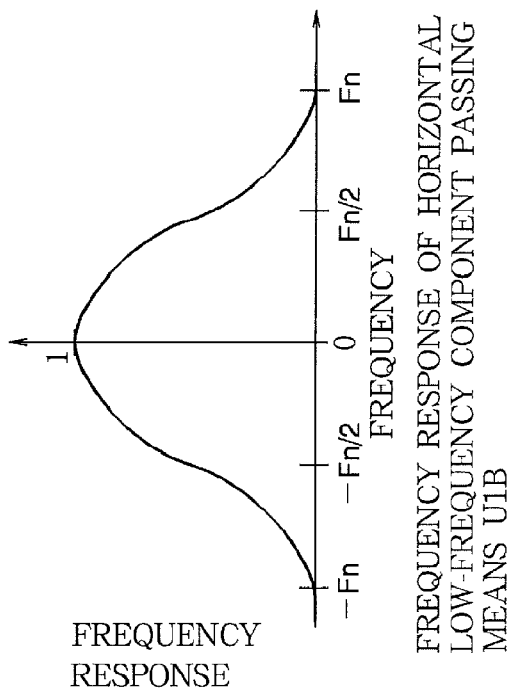

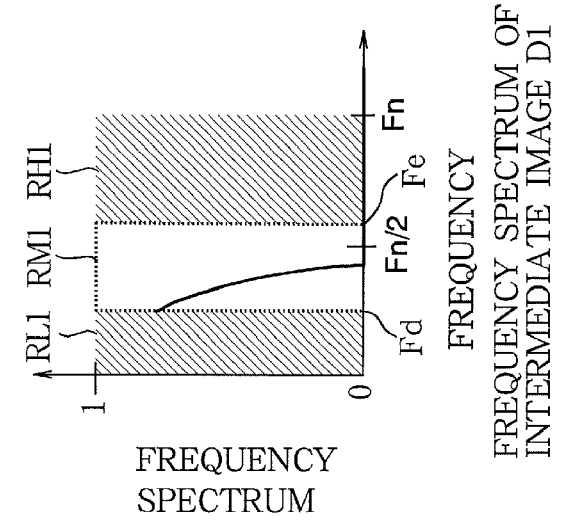
FIG.10 (D) FREQUENCY RESPONSE OF INTERMEDIATE IMAGE GENERATING MEANS 1
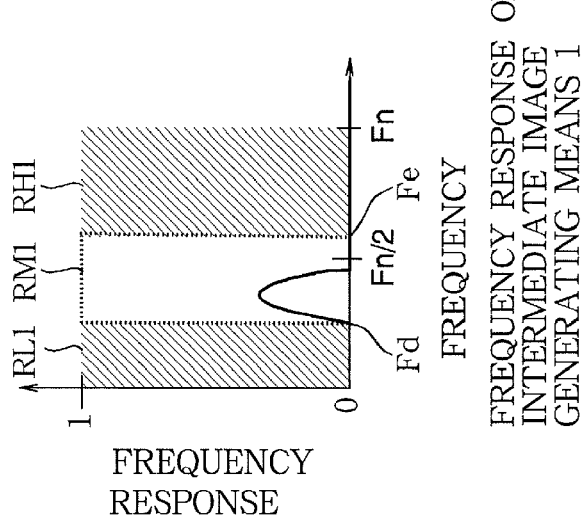
FIG.10 (E) FREQUENCY SPECTRUM OF INTERMEDIATE IMAGE D1

FIG.17(A)

HORIZONTAL COORDINATE

| | 1 | 2 | 3 | 4 |
|---|---|---|---|---|
| 1 | D1h(11) | D1h(21) | D1h(31) | D1h(41) |
| 2 | D1h(12) | D1h(22) | D1h(32) | D1h(42) |
| 3 | D1h(13) | D1h(23) | D1h(33) | D1h(43) |
| 4 | D1h(14) | D1h(24) | D1h(34) | D1h(44) |

VERTICAL COORDINATE

FIG.17(B)

HORIZONTAL COORDINATE

| | 1 | 2 | 3 | 4 |
|---|---|---|---|---|
| 1 | D1v(11) | D1v(21) | D1v(31) | D1v(41) |
| 2 | D1v(12) | D1v(22) | D1v(32) | D1v(42) |
| 3 | D1v(13) | D1v(23) | D1v(33) | D1v(43) |
| 4 | D1v(14) | D1v(24) | D1v(34) | D1v(44) |

VERTICAL COORDINATE

FIG.17(C)

HORIZONTAL COORDINATE

| | 1 | 2 | 3 | 4 |
|---|---|---|---|---|
| 1 | D2h(11) | D2h(21) | D2h(31) | D2h(41) |
| 2 | D2h(12) | D2h(22) | D2h(32) | D2h(42) |
| 3 | D2h(13) | D2h(23) | D2h(33) | D2h(43) |
| 4 | D2h(14) | D2h(24) | D2h(34) | D2h(44) |

VERTICAL COORDINATE

FIG.17(D)

HORIZONTAL COORDINATE

| | 1 | 2 | 3 | 4 |
|---|---|---|---|---|
| 1 | D2v(11) | D2v(21) | D2v(31) | D2v(41) |
| 2 | D2v(12) | D2v(22) | D2v(32) | D2v(42) |
| 3 | D2v(13) | D2v(23) | D2v(33) | D2v(43) |
| 4 | D2v(14) | D2v(24) | D2v(34) | D2v(44) |

VERTICAL COORDINATE

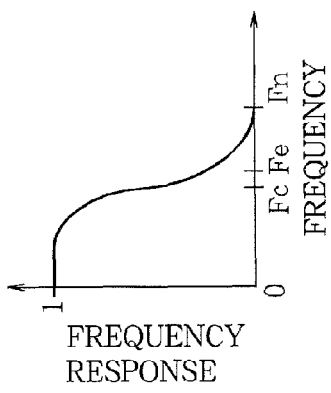
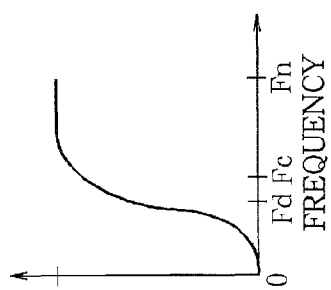
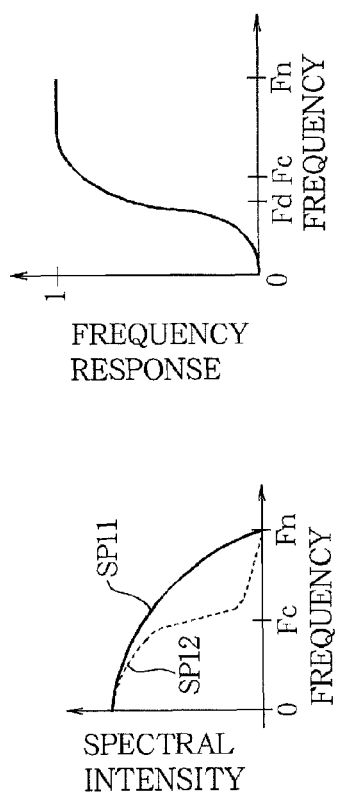
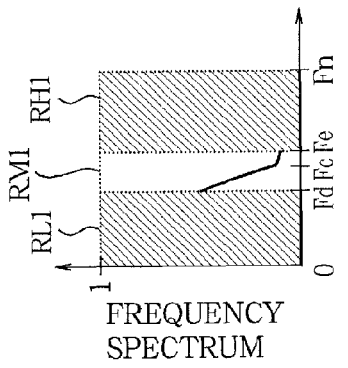
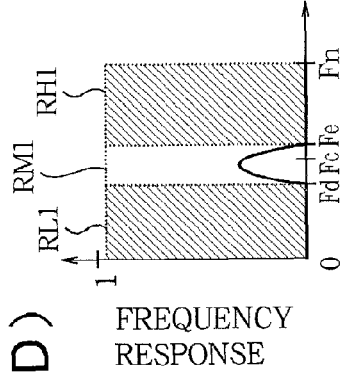

IMAGE PROCESSING APPARATUS AND METHOD AND IMAGE DISPLAY APPARATUS

FIELD OF THE INVENTION

The present invention relates to an image processing apparatus and an image processing method that enhance an input image by, for example, generating and adding high frequency components to an enlarged input image that is an enlargement of an original image, in order to obtain an output image with high perceived resolution, and to an image display apparatus using this image processing apparatus and method.

The present invention also enhances an image in such a way that when an image including noise is input, after the noise is eliminated, an output image with high perceived resolution is obtained.

BACKGROUND ART

Images are generally reproduced and displayed after image signals representing the images have been subjected to appropriate image processing image (hereinafter, an 'image signal' or 'image data' may be referred to simply as an 'image').

In the image processing apparatus disclosed in patent document 1, for example, following multiresolution decomposition, a desired frequency band is enhanced by specifying an enhancement coefficient for the image in the desired frequency band according to the image signal in a lower frequency band.

PRIOR ART REFERENCES

Patent Documents

Patent document 1: Japanese Patent Application Publication No. H9-44651

SUMMARY OF THE INVENTION

Problems to be Solved by the Invention

In the image processing apparatus in which an appropriate enhancement coefficient is specified for the image in the desired frequency band of the decomposed multiresolution image, however, for some input images the enhancement processing is inappropriate or inadequate and output images with proper picture quality cannot be obtained.

If an image that has been subjected to an enlargement process is input, for example, part of the frequency spectrum of the image before the enlargement processing folds over and appears as a fold-over component on the high-frequency side of the frequency spectrum of the input image. Simply enhancing the high frequency component is then inappropriate, because the fold-over component is enhanced. If the frequency band is limited so as to enhance only a frequency band excluding the fold-over component, however, then enhancement of the high-frequency side of the frequency spectrum must be avoided, and in consequence, the enhancement process is inadequate.

If a noise-eliminated image is input, the high-frequency side of the frequency spectrum has been eliminated by the noise elimination process. Attempts to extract the high-frequency component therefore fail, which may make it impossible to carry out adequate image enhancement processing.

When an image including noise is input, simply enhancing the high-frequency component is inappropriate because the noise included in the enhanced frequency band is also enhanced.

Means of Solution of the Problems

The image processing apparatus of the invention includes:
a first intermediate image generating means for generating a first intermediate image by extracting a component in a vicinity of a certain frequency band of an input image;
a second intermediate image generating means for generating a second intermediate image from the first intermediate image; and
an adding means for adding the input image and the second intermediate image.

Effect of the Invention

According to the present invention, adequate image enhancement processing can be carried out even if the frequency spectrum of the input image includes a fold-over component on the high-frequency side, or does not include adequate high-frequency components.

BRIEF DESCRIPTION OF THE DRAWINGS

FIGS. 8(A) to 8(E) are pixel arrangement diagrams illustrating the operation of the image enlarging means U1 in FIG. 6.

FIGS. 9(A) to 9(D) are diagrams showing frequency spectra and a frequency response to illustrate the operation of the image enlarging means U1 in FIG. 6.

FIGS. 10(A) to 10(E) are diagrams showing frequency spectra and frequency responses to illustrate the operation of the first intermediate image generating means 1 in FIG. 1.

FIGS. 17(A) to 17(D) are diagrams representing image D1$h$, image D1$v$, image D2$h$, and image D2$v$ in FIG. 2.

FIGS. 22(A) to 22(E) are diagrams showing frequency spectra and frequency responses to illustrate the operation of the first intermediate image generating means 1 in the third embodiment.

MODES FOR CARRYING OUT THE INVENTION

First Embodiment

Figure 1:
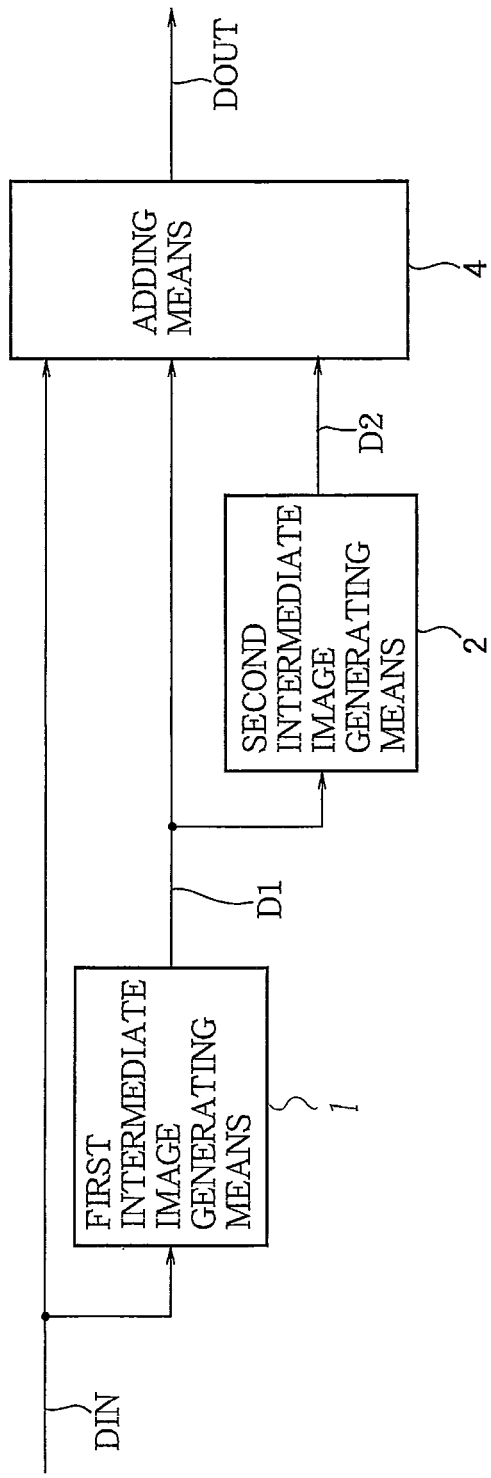
FIG. 1 is a block diagram illustrating the structure of an image processing apparatus according to a first embodiment of the invention.

FIG. 1 is a diagram illustrating an exemplary structure of an image processing apparatus according to the first embodiment of the invention; the image processing apparatus can be utilized as, for example, part of an image display apparatus.

The illustrated image processing apparatus includes a first intermediate image generating means 1, a second intermediate image generating means 2, and an adding means 4.

The first intermediate image generating means 1 generates an intermediate image D1 (the first intermediate image) by extracting a component in a vicinity of a particular frequency band from an input image DIN.

The second intermediate image generating means 2 generates an intermediate image D2 (the second intermediate image) by carrying out certain processing, which will be described later, on intermediate image D1.

The adding means 4 adds the input image DIN, the first intermediate image D1, and the second intermediate image D2. The image obtained as the resulting sum by the adding means 4 is output as an output image DOUT.

Figure 2:
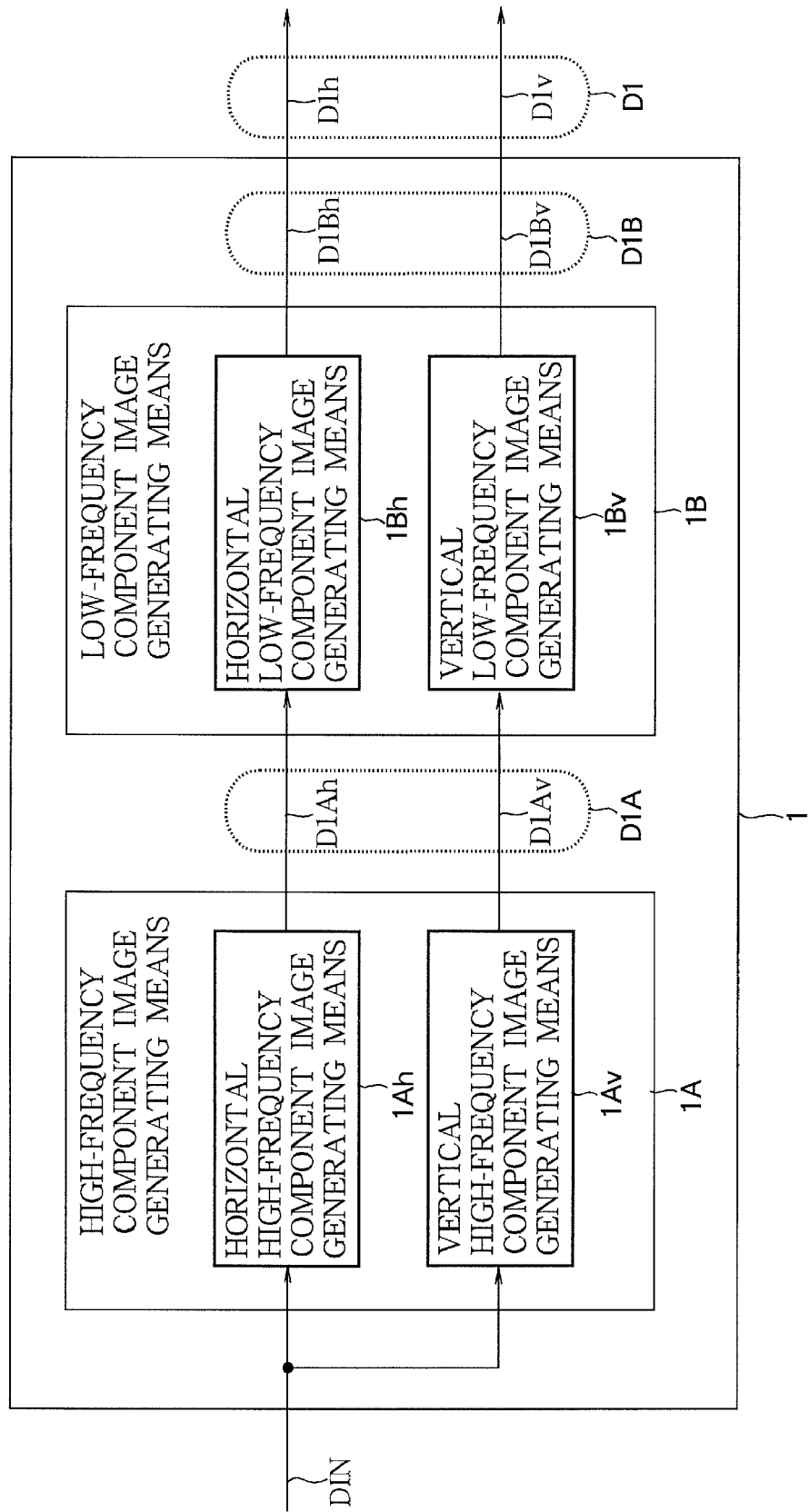
FIG. 2 is a block diagram illustrating an exemplary structure of the first intermediate image generating means 1 in FIG. 1.

FIG. 2 shows an exemplary structure of the first intermediate image generating means 1; the illustrated first intermediate image generating means 1 includes a high-frequency component image generating means 1A for generating an image D1A (the first high-frequency component image) by removing frequency components below the particular frequency band from the input image DIN and extracting only a high frequency component of the input image DIN, and a low-frequency component image generating means 1B for generating an image D1B by removing frequency components above the particular frequency band from image D1A and extracting only a low-frequency component of image D1A.

The high-frequency component image generating means 1A and the low-frequency component image generating means 1B form a band-pass filter means for extracting the component in the particular frequency band. Image D1B is output from the first intermediate image generating means 1 as intermediate image D1.

Figure 3:
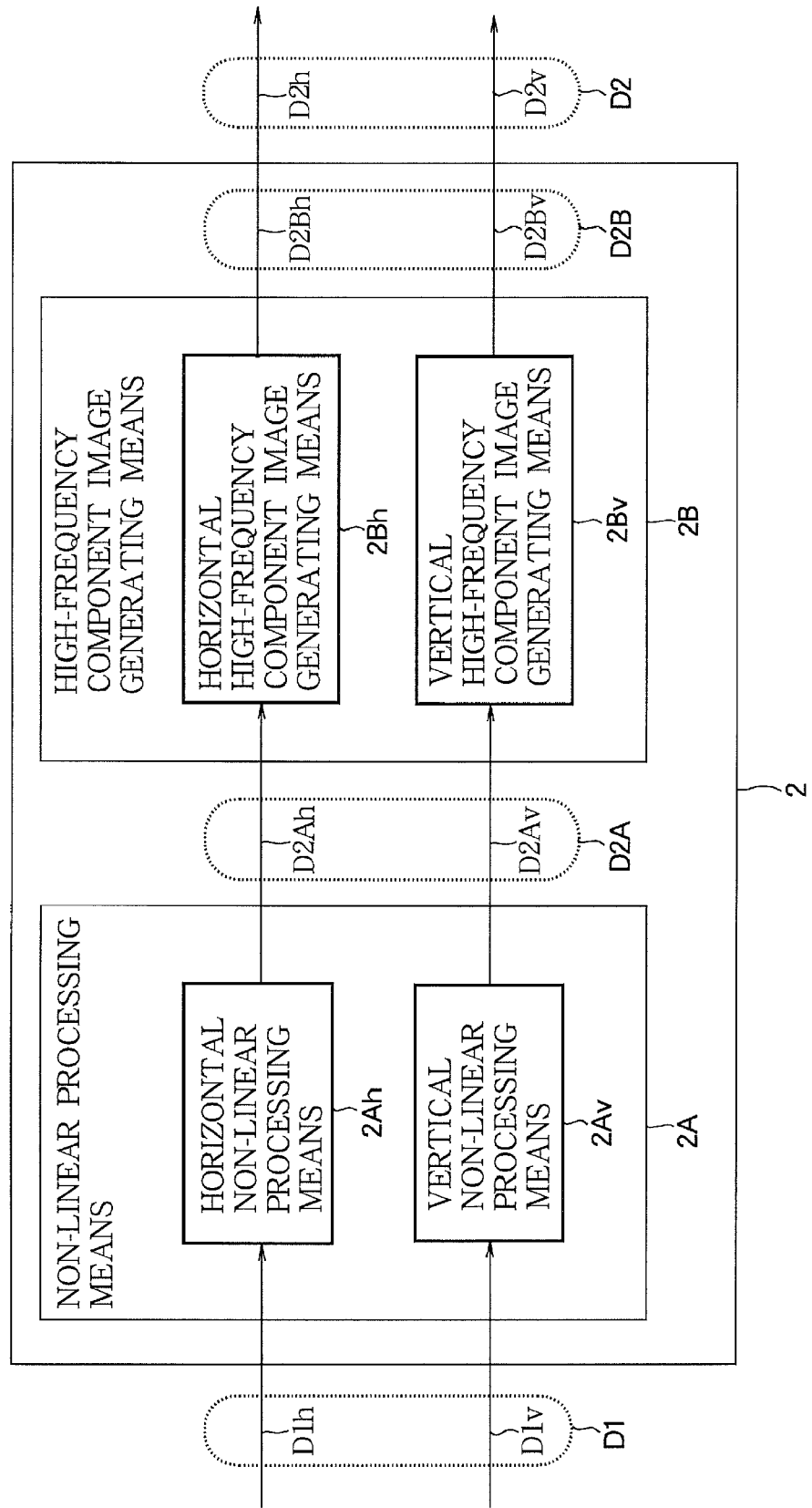
FIG. 3 is a block diagram illustrating an exemplary structure of the second intermediate image generating means 2 in FIG. 1.

FIG. 3 shows an exemplary structure of the second intermediate image generating means 2. The illustrated second intermediate image generating means 2 includes a non-linear processing means 2A for outputting an image D2A obtained by performing non-linear processing, which will be described later, on intermediate image D1, and a high-frequency component image generating means 2B for outputting an image D2B obtained by extracting only a high-frequency component from image D2A. Image D2B is output from the second intermediate image generating means 2 as intermediate image D2.

The operation of the image processing apparatus in the first embodiment of the invention will be described in detail below. Unless otherwise specified, Fn will denote the Nyquist frequency of the input image DIN in the description below. First the detailed operation of the first intermediate image generating means 1 will be described.

In the first intermediate image generating means 1, the high-frequency component image generating means 1A generates image D1A by extracting only the high-frequency component of the input image DIN at and above a first frequency Fd. In the illustrated example, the first frequency Fd is slightly less than Fn/2. The high-frequency component can be extracted by performing a high-pass filtering process. The high-frequency component is extracted in the horizontal direction and vertical direction separately. The high-frequency component image generating means 1A therefore includes a horizontal high-frequency component image generating means 1A$h$ for generating an image D1A$h$ by performing a horizontal high-pass filtering process on the input image DIN to extract only a horizontal high-frequency component at and above a first horizontal frequency, and a vertical high-frequency component image generating means 1Av for generating an image D1Av by performing a vertical high-pass filtering process to extract a vertical high-frequency component at and above a first vertical frequency; image D1A includes image D1Ah and image D1Av.

Next, in the first intermediate image generating means 1, the low-frequency component image generating means 1B generates an image D1B by extracting only the low-frequency component of image D1A at and below a second frequency Fe. In the illustrated example, the second frequency Fe is slightly greater than Fn/2. The low-frequency component can be extracted by performing a low-pass filtering process. The low-frequency component is extracted in the horizontal direction and the vertical direction separately. The low-frequency component image generating means 1B therefore includes a horizontal low-frequency component image generating means 1Bh for generating an image D1Bh by performing a horizontal low-pass filtering process on image D1Ah to extract a horizontal low-frequency component at and below a second horizontal frequency, and a vertical low-frequency component image generating means 1Bv for generating an image D1Bv by performing a vertical low-pass filtering process on image D1Av to extract a vertical low-frequency component at and below a second vertical frequency; image D1B includes image D1Bh and image D1Bv. Image D1B is output from the first intermediate image generating means 1 as intermediate image D1. Intermediate image D1 includes an image D1$h$ corresponding to image D1Bh and an image D1$v$ corresponding to image D1Bv.

Next the detailed operation of the second intermediate image generating means 2 will be described.

In the second intermediate image generating means 2, first the non-linear processing means 2A generates image D2A by performing non-linear processing, which will be described later, on intermediate image D1. The non-linear processing is performed in the horizontal direction and vertical direction separately. The non-linear processing means 2A includes a horizontal non-linear processing means 2Ah for generating an image D2Ah by performing non-linear processing, which will be described later, on image D1$h$, and a vertical non-linear processing means 2Av for generating an image D2Av by performing non-linear processing, which will be described later, on image D1$v$; image D2A includes image D2Ah and image D2Av.

The operation of the non-linear processing means 2A will now be described in further detail. The horizontal non-linear processing means 2Ah and the vertical non-linear processing means 2Av included in the non-linear processing means 2A have the same structure. Here the horizontal non-linear processing means 2Ah performs processing in the horizontal direction, and the vertical non-linear processing means 2Av performs processing in the vertical direction.

Figure 4:
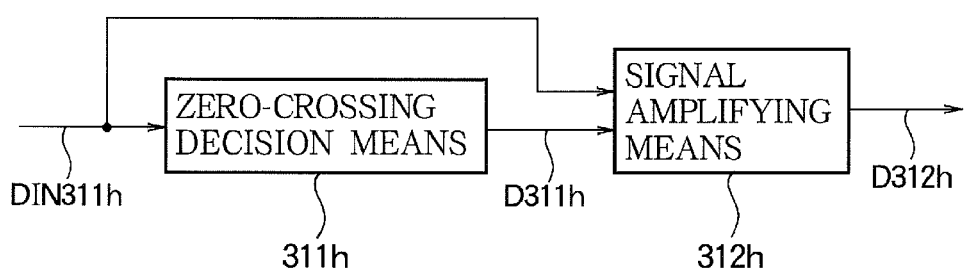
FIG. 4 is a block diagram illustrating an exemplary structure of the horizontal non-linear processing means 2Ah in FIG. 3.

FIG. 4 is a diagram illustrating an exemplary structure of the horizontal non-linear processing means 2Ah. The illustrated horizontal non-linear processing means 2Ah includes a zero-crossing decision means 311$h$ and a signal amplifying means 312$h$. The horizontal non-linear processing means 2Ah receives image D1$h$ as an input image DIN311$h$.

The zero-crossing decision means 311$h$ checks the pixel values in the input image DIN311$h$ for changes in the horizontal direction. A point where the pixel value changes from positive to negative or from negative to positive is identified as a zero-crossing point, and the positions of the pixels preceding and following the zero-crossing point (the adjacently preceding and following pixels) are reported to the signal amplifying means 312$h$ by a signal D311$h$. Preceding and following herein means the preceding and following positions in the sequence in which signals are supplied: the positions to the left and right when the pixel signals are supplied from left to right in the horizontal direction, or the positions above and below when the pixel signals are supplied from top to bottom in the vertical direction. The zero-crossing decision means 311$h$ in the horizontal non-linear processing means 2Ah recognizes the pixels to the left and right of the zero-crossing point as the pixels preceding and following the zero-crossing point.

The signal amplifying means 312$h$ identifies the pixels preceding and following the zero-crossing point (the adjacently preceding and following pixels) in accordance with signal D311$h$ and generates a non-linear image D312$h$ by amplifying the pixel values (increasing the absolute values) of only the pixels preceding and following the zero-crossing point. The amplification factor for the pixel values of the pixels preceding and following the zero-crossing point is a value greater than 1; the amplification factor for the pixel values of other pixels is 1.

The non-linear image D312$h$ is output from the horizontal non-linear processing means 2Ah as image D2Ah.

Figure 5:
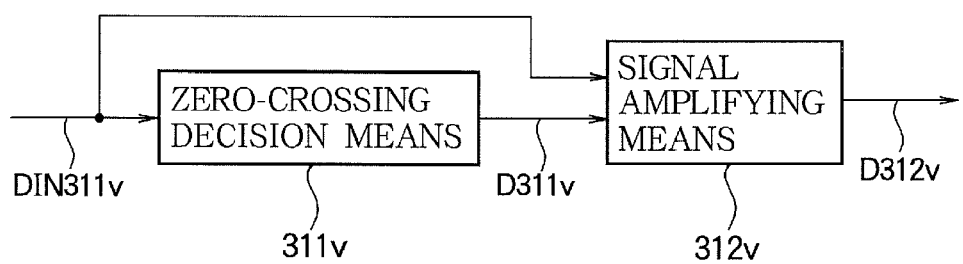
FIG. 5 is a block diagram illustrating an exemplary structure of the vertical non-linear processing means 2Av in FIG. 3.

FIG. 5 is a diagram illustrating the structure of the vertical non-linear processing means 2Av. The illustrated vertical non-linear processing means 2Av includes a zero-crossing decision means 311$v$ and a signal amplifying means 312$v$. Image D1$v$ is input to the vertical non-linear processing means 2Av as an input image DIN311$v$.

The zero-crossing decision means 311$v$ checks the pixel values in the input image DIN311$v$ for changes in the vertical direction. A point where the pixel value changes from positive to negative or from negative to positive is identified as a zero-crossing point, and the positions of the pixels preceding and following the zero-crossing point (the adjacently preceding and following pixels) are reported to the signal amplifying means 312$v$ by a signal D311$v$. The zero-crossing decision means 311$v$ in the vertical non-linear processing means 2Av recognizes the pixels above and below the zero-crossing point as the pixels preceding and following the zero-crossing point.

The signal amplifying means 312$v$ identifies the pixels preceding and following the zero-crossing point (the adjacently preceding and following pixels) from signal D311$v$ and generates a non-linear image D312$v$ by amplifying only the pixel values (increasing the absolute values) of the pixels preceding and following the zero-crossing point. The amplification factor for the pixel values of the pixels preceding and following the zero-crossing point is a value greater than 1, and the amplification factor for the pixel values of other pixels is 1.

The non-linear processing means 2A operates as described above.

Next, in the second intermediate image generating means 2, the high-frequency component image generating means 2B generates image D2B by extracting only the high-frequency component of image D2A at and above a third frequency Ff. The high-frequency component can be extracted by performing a high-pass filtering process. In the illustrated example, the third frequency Ff is equal to Fn/2.

The high-frequency component of the image is extracted in the horizontal direction and the vertical direction separately. The high-frequency component image generating means 2B includes a horizontal high-frequency component image generating means 2Bh for generating an image D2Bh by performing a horizontal high-pass filtering process on image D2Ah to extract a horizontal high-frequency component at and above a third horizontal frequency, and a vertical high-frequency component image generating means 2Bv for generating an image D2Bv by performing a vertical high-pass filtering process on image D2Av to extract a vertical high-frequency component at and above a third vertical frequency; image D2B includes image D2Bh and image D2Bv.

Image D2B is output from the second intermediate image generating means 2 as intermediate image D2. Intermediate image D2 includes an image D2h corresponding to image D2Bh and an image D2v corresponding to image D2Bv.

Next, the adding means 4 adds intermediate image D1 and intermediate image D2 to the input image DIN. Intermediate image D1 includes image D1h and image D1v, and intermediate image D2 includes image D2h and image D2v, so that to add intermediate image D1 and image D2 means to add all the above images D1h, D1v, D2h, and D2v.

The addition process performed by the adding means 4 is not limited to simple addition; weighted addition may be performed instead. Each of the images D1h, D1v, D2h, and D2v may be amplified by a different amplification factor before being added.

An example in which the image processing apparatus in the first embodiment is utilized as part of an image display apparatus will now be described. The description will clarify the effects of the image processing apparatus in the first embodiment.

Figure 6:
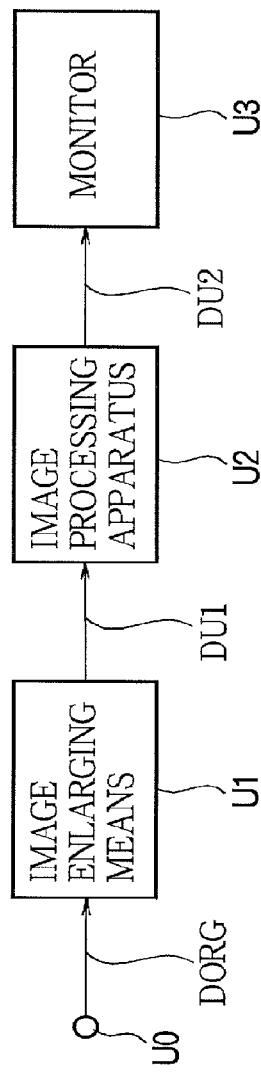
FIG. 6 is a block diagram illustrating an exemplary structure of an image display apparatus utilizing the image processing apparatus in FIG. 1.

FIG. 6 illustrates an image display apparatus that uses the image processing apparatus in the first embodiment to display an image corresponding to an original image DORG on a monitor U3.

If the image size of the original image DORG supplied to the input terminal U0 is smaller than the image size of the monitor U3, the image enlarging means U1 outputs an image DU1 obtained by enlarging the original image DORG. The image can be enlarged by the bicubic method, for example.

The image processing apparatus U2 of the first embodiment outputs an image DU2 obtained by performing the processing described above on image DU1. Image DU2 is displayed on the monitor U3.

The operation and effects of the image enlarging means U1 will be described below on the assumption that the number of pixels in the original image DORG is half of the number of pixels in the monitor U3 in both the horizontal and vertical directions.

Figure 7:
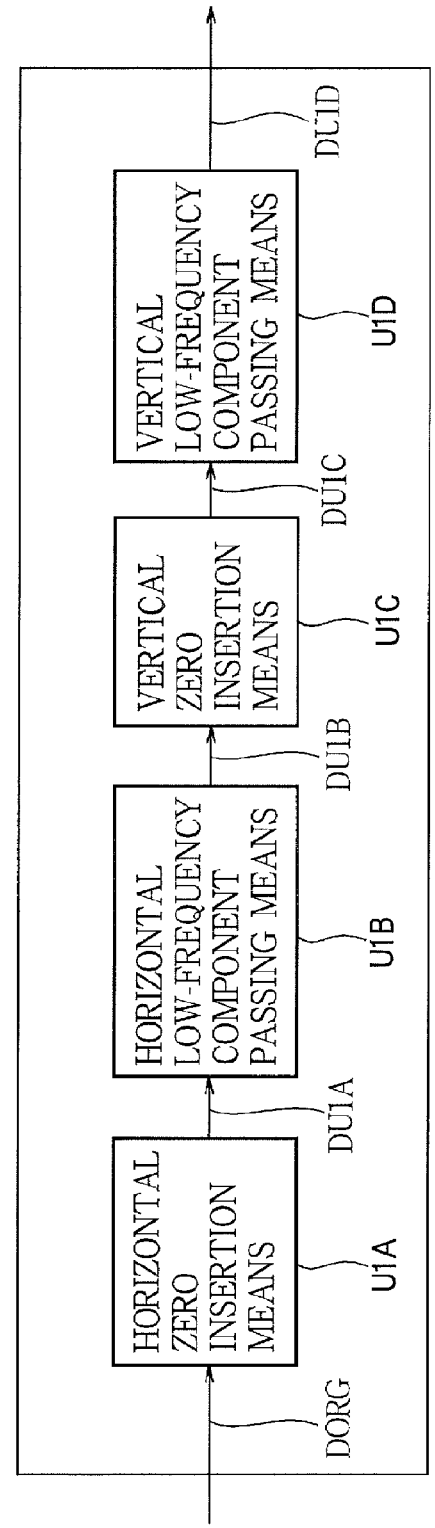
FIG. 7 is a block diagram illustrating an exemplary structure of the image enlarging means U1 in FIG. 6.

FIG. 7 is a diagram illustrating the structure and operation of the image enlarging means U1. The image enlarging means U1 includes a horizontal zero insertion means U1A, a horizontal low-frequency component passing means U1B, a vertical zero insertion means U1C, and a vertical low-frequency component passing means U1D. The horizontal zero insertion means U1A generates an image DU1A by appropriately inserting pixels having a pixel value of 0 into the original image DORG in the horizontal direction. The horizontal low-frequency component passing means U1B generates an image DU1B by performing a low-pass filtering process to extract only a low-frequency component from image DU1A. The vertical zero insertion means U1C generates an image DU1C by appropriately inserting pixels having a pixel value of 0 into image DU1B in the vertical direction. The vertical low-frequency component passing means U1D generates an image DU1D by extracting only a low-frequency component from image DU1C. Image DU1D, which is output from the image enlarging means U1 as image DU1, is an enlargement of the original image DORG by a factor of two in both the horizontal direction and the vertical direction.

FIGS. 8(A) to 8(E) are diagrams illustrating the operation of the image enlarging means U1 in detail: FIG. 8(A) shows the original image DORG; FIG. 8(B) shows image DU1A; FIG. 8(C) shows image DU1B; FIG. 8(D) shows image DU1C; FIG. 8(E) shows image DU1D. In FIGS. 8(A) to 8(E), each box represents a pixel, and the characters or numbers in the box represent the pixel value of the corresponding pixel.

The horizontal zero insertion means U1A generates the image DU1A shown in FIG. 8(B) by inserting a pixel having a pixel value of 0 for each pixel in the original image DORG shown in FIG. 8(A) in the horizontal direction (inserting a column of pixels having pixel values of 0 between each horizontally adjacent pair of pixel columns in the original image DORG). The horizontal low-frequency component passing means U1B generates the image DU1B shown in FIG. 8(C) by performing a low-pass filtering process on the image DU1A shown in FIG. 8(B). The vertical zero insertion means U1C generates the image DU1C shown in FIG. 8(D) by inserting a pixel having a pixel value of 0 for each pixel in image DU1B shown in FIG. 8(C) in the vertical direction (inserting a row of pixels having pixel values of 0 between each vertically adjacent pair of pixel rows in image DU1B). The vertical low-frequency component passing means U1D generates the image DU1D shown in FIG. 8(E) by performing a low-pass filtering process on the image DU1C shown in FIG. 8(D). The image DU1D generated by this processing is twice as large as the original image DORG in both the horizontal and vertical directions. If the low-pass filtering process is considered to be implemented by weighted addition, then the enlargement process could be said to be implemented by appropriately weighted addition of the pixel values of the original image DORG.

FIGS. 9(A) to 9(D) represent the effect of processing by the image enlarging means U1 in the frequency domain: FIG. 9(A) represents the frequency spectrum of the original image DORG; FIG. 9(B) represents the frequency spectrum of image DU1A; FIG. 9(C) represents the frequency response of the horizontal low-frequency component passing means U1B; FIG. 9(D) represents the frequency spectrum of image DU1B. In FIGS. 9(A) to 9(D), the horizontal axis is a frequency axis representing spatial frequency in the horizontal direction, and the vertical axis represents the intensity value of the frequency spectrum or frequency response. The number of pixels in the original image DORG is half the number of pixels in the input image DIN; in other words, the sampling interval of the original image DORG is twice the sampling interval of the input image DIN. Consequently, the Nyquist frequency of the original image DORG is half the Nyquist frequency of the input image DIN, i.e., Fn/2.

For the sake of simplicity, a single frequency axis is used in FIGS. 9(A) to 9(D). Image data in general, however, assign pixel values to pixels arranged in a two-dimensional array, and their frequency spectra are described in a plane determined by a horizontal frequency axis and a vertical frequency axis. Accordingly, both the horizontal frequency axis and the vertical frequency axis should be indicated to represent the frequency spectra of images such as DORG accurately. Since frequency spectra are generally isotropic about the origin of the frequency axes, if a frequency spectrum is given in a space with a single frequency axis, those skilled in the art can easily imagine how the frequency spectrum appears in a space with two frequency axes. Therefore, unless otherwise specified, spaces with a single frequency axis will be used in the descriptions related to the frequency domain.

First the frequency spectrum of the original image DORG will be described. The image input as the original image DORG is generally a natural image and its spectral intensity is concentrated around the origin of the frequency space. The frequency spectrum of the original image DORG accordingly resembles spectrum SPO in FIG. 9(A).

Next the spectral intensity of image DU1A will be described. Image DU1A is generated by inserting a pixel having a pixel value of 0 for each pixel in the original image DORG in the horizontal direction. This process causes the frequency spectrum to fold over at the Nyquist frequency of the original image DORG. Because a spectrum SPM is generated by fold-over of the spectrum SPO at frequencies of ±Fn/2, the frequency spectrum of image DU1A is represented as shown in FIG. 9(B).

Next the frequency response of the horizontal low-frequency component passing means U1B will be described. The horizontal low-frequency component passing means U1B is implemented by a low-pass filter, and its frequency response decreases as the frequency increases, as shown in FIG. 9(C).

Finally, the frequency spectrum of image DU1B will be described. Image DU1B is obtained by performing a low-pass filtering process, with the frequency response shown in FIG. 9(C), on the image DU1A having the frequency spectrum shown in FIG. 9(B). Accordingly, as shown, the frequency spectrum of image DU1B includes a spectrum SP2 having a somewhat lower intensity than spectrum SPM and a spectrum SP1 having a somewhat lower intensity than spectrum SPO. The frequency response of a low-pass filter generally decreases as the frequency increases. In comparison with spectrum SPO, spectrum SP1 has an intensity lowered, by the horizontal low-frequency component passing means U1B, on the high-frequency side, at frequencies near ±Fn/2.

Among the processing by the image enlarging means U1, the effects in the frequency domain of the processing performed by the vertical zero insertion means U1C and the vertical low-frequency component passing means U1D will not be described, but from the content of the processing it can be easily understood that the effects are as described with reference to FIGS. 9(A) to 9(D), though in the direction of the vertical spatial frequency axis. The frequency spectrum of image DU1D becomes a two-dimensional expansion of the frequency spectrum shown in FIG. 9(D).

In the subsequent description, spectrum SP2 will be referred to as the fold-over component. The fold-over component appears on an image as a spurious signal or noise having relatively high frequency components. This type of noise or spurious signal includes overshoot, jaggies, ringing, and the like.

The effects of the image processing apparatus according to the first embodiment will now be described.

Figure 10A:
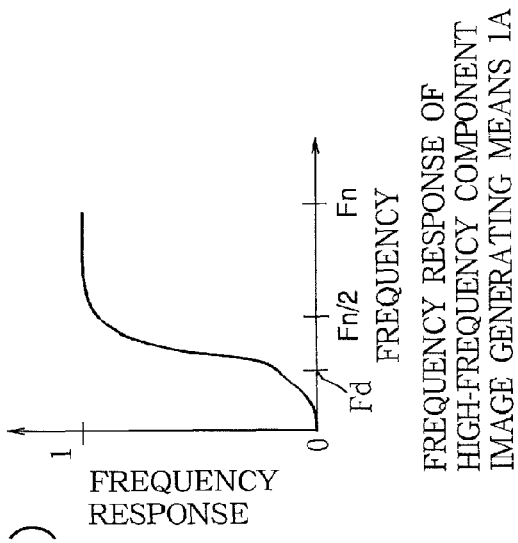
Figure 10B:
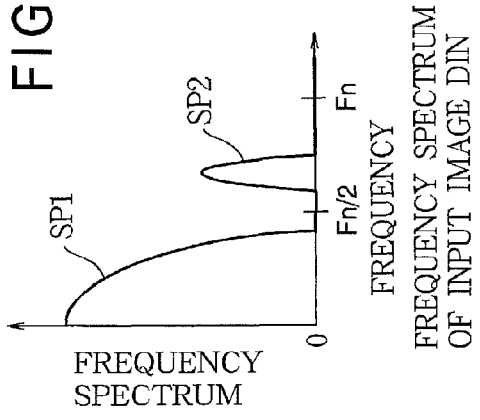
Figure 10C:
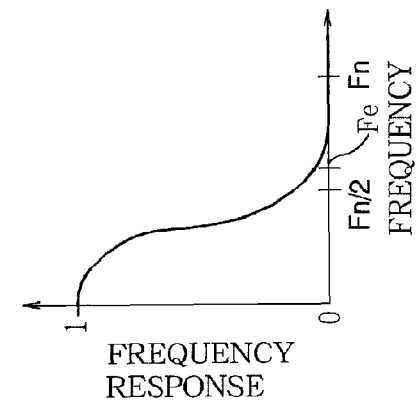

FIGS. 10(A) to 10(E) are diagrams schematically representing the effect of generating intermediate image D1 from the input image DIN when an image DU1D obtained by enlarging the original image DORG is input as the input image DIN (or image DU1): FIG. 10(A) represents the frequency spectrum of the input image DIN; FIG. 10(B) represents the frequency response of high-frequency component image generating means 1A; FIG. 10(C) represents the frequency response of the low-frequency component image generating means 1B; FIG. 10(D) represents the frequency response of the first intermediate image generating means 1; FIG. 10(E) represents the frequency spectrum of intermediate image D1. FIGS. 10(A) to 10(E) use just a single frequency axis for the same reason as in FIGS. 9(A) to 9(D).

In FIGS. 10(A) to 10(E), the intensity value of the frequency spectrum or frequency response is shown only in the range where the spatial frequency is zero or greater, but the frequency spectrum or frequency response described below is symmetrical about the origin on the frequency axis. Therefore, the diagrams used in the description, showing only the range in which the spatial frequency is zero or greater, are sufficient.

First the frequency spectrum of the input image DIN will be described. Because image DU1D is input as the input image DIN, the frequency spectrum of the input image DIN, shown in FIG. 10(A), has the same form as shown in FIG. 9(D), including a spectrum SP1 which has a somewhat lower intensity than the spectrum SPO of the original image DORG and a spectrum SP2, which is a fold-over component.

Next the frequency response of high-frequency component image generating means 1A will be described. Since high-frequency component image generating means 1A is implemented by a high-pass filter, its frequency response decreases as the frequency decreases, as shown in FIG. 10(B).

Next the frequency response of the low-frequency component image generating means 1B will be described. Since the low-frequency component image generating means 1B is implemented by a low-pass filter, its frequency response decreases as the frequency increases, as shown in FIG. 10(C).

Next the frequency response of the first intermediate image generating means 1 will be described. Among the frequency components of the input image DIN, the frequency component in the low-frequency region RL1 shown in FIG. 10(D) is weakened by the high-frequency component image generating means 1A in the first intermediate image generating means 1. The frequency component in the high-frequency region RH1 shown in FIG. 10(D) is weakened by the low-frequency component image generating means 1B in the first intermediate image generating means 1. Therefore, as shown in FIG. 10(D), the frequency response of the first intermediate image generating means 1 has a peak in an intermediate region RM1 bounded by the low-frequency region RL1 and the high-frequency region RH1.

The intermediate region RM1, which does not include a fold-over component generated through the insertion of pixels having pixel values of 0 into the original image DORG, occupies part of the region at and below the Nyquist frequency Fn/2 of the original image DORG.

Next the frequency spectrum of intermediate image D1 will be described. The intermediate image D1 shown in FIG. 10(E) is obtained by passing the input image DIN having the frequency spectrum shown in FIG. 10(A) through the first intermediate image generating means 1 having the frequency response shown in FIG. 10(D). Since the frequency response of the first intermediate image generating means 1 peaks in the intermediate region RM1 limited by the low-frequency region RL1 and the high-frequency region RH1, the frequency spectrum of intermediate image D1 is the frequency spectrum of the input image DIN with attenuation of the parts included in the low-frequency region RL1 and high-frequency region RH1. Therefore, spectrum SP2 of a fold-over component is removed from the high-frequency component of the input image DIN to provide the intermediate image D1. In other words, the first intermediate image generating means 1 has the effect of generating intermediate image D1 by removing spectrum SP2, which is a fold-over component, from the high-frequency component of the input image DIN.

Figure 11:
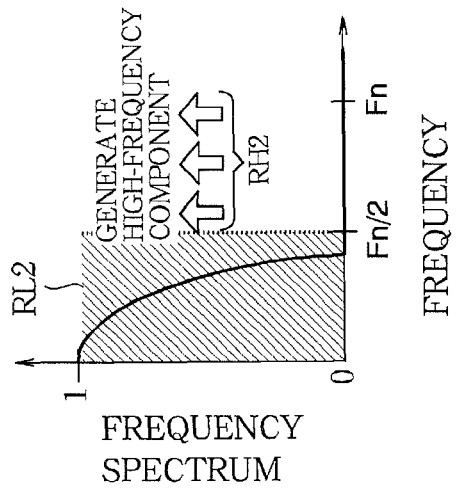
FIGS. 11(A) to 11(C) are diagrams showing frequency spectra and a frequency response to illustrate the operation of the second intermediate image generating means 2 in FIG. 1.
Figure 11:
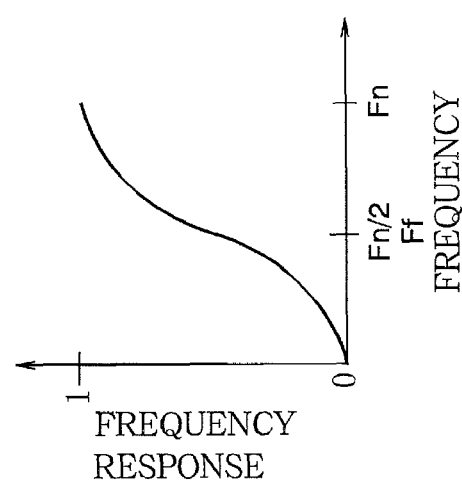
Figure 11:
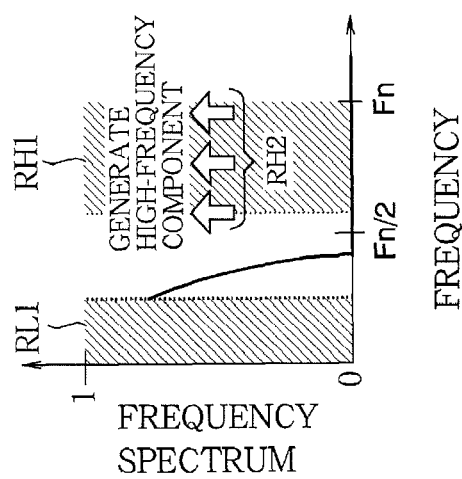

FIGS. 11(A) to 11(C) are diagrams representing the operation and effect of the second intermediate image generating means 2: FIG. 11(A) represents the frequency spectrum of the non-linearly processed image D2A; FIG. 11(B) represents the frequency response of high-frequency component image generating means 2B; FIG. 11(C) represents the frequency spectrum of image D2B. FIGS. 11(A) to 11(C) represent the frequency spectra and frequency response only in the range where the spatial frequency is 0 or greater, for the same reason as in FIGS. 10(A) to 10(E).

A high-frequency component corresponding to the high-frequency region RH2 is generated in non-linearly processed image D2A, as described later. FIG. 11(A) expresses this schematically. Image D2B is generated by passing the non-linearly processed image D2A through high-frequency component image generating means 2B. High-frequency component image generating means 2B includes a high-pass filter, and its frequency response increases as the frequency increases as shown in FIG. 11(B). Accordingly, the frequency spectrum of image D2B is obtained by removing a component corresponding to the low-frequency region RL2 from the frequency spectrum of the non-linearly processed image D2A, as shown in FIG. 11(C). In other words, the non-linear processing means 2A has the effect of generating a high-frequency component corresponding to the high-frequency region RH2, and high-frequency component image generating means 2B has the effect of extracting only the high-frequency component generated by the non-linear processing means 2A.

The above operations and effects will now be described in further detail.

FIGS. 12(A) to 12(C) and FIGS. 13(A) to 13(C) are diagrams illustrating a step edge and consecutive pixel signal values obtained when the step edge is sampled.

Figure 12A:
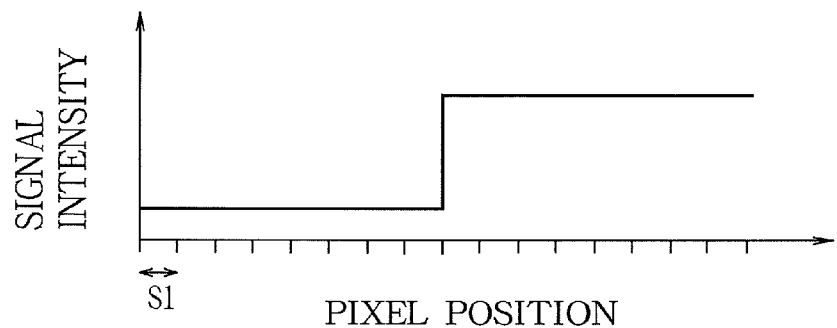
FIGS. 12(A) to 12(C) are diagrams illustrating a step edge and indicating values of consecutive pixel signals obtained when the step edge is sampled with a sampling interval S1.
Figure 12B:
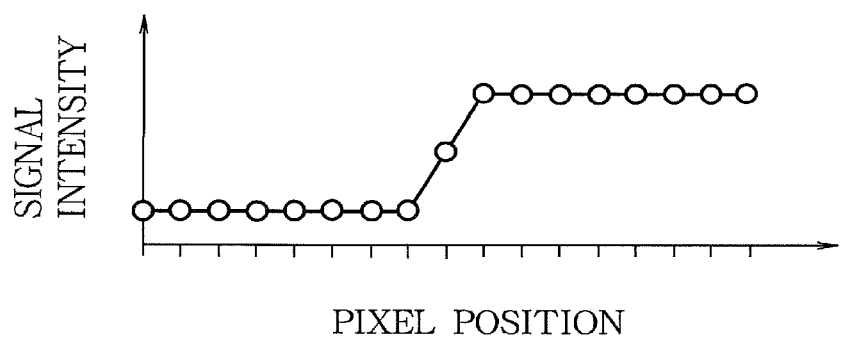
Figure 12C:
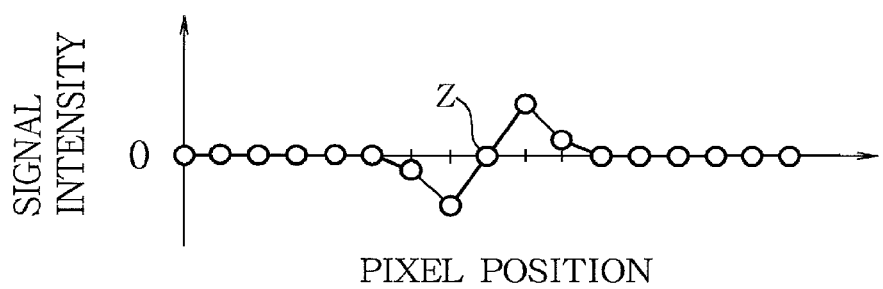
Figure 13:
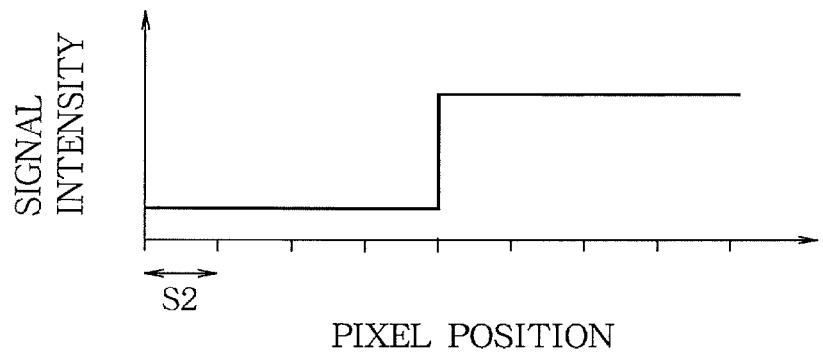
FIGS. 13(A) to 13(C) are diagrams illustrating a step edge and indicating values of consecutive pixel signals obtained when the step edge is sampled with a sampling interval S2.
Figure 13:
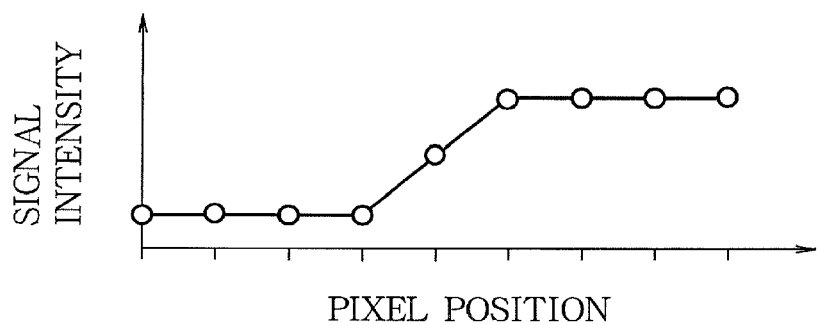
Figure 13:
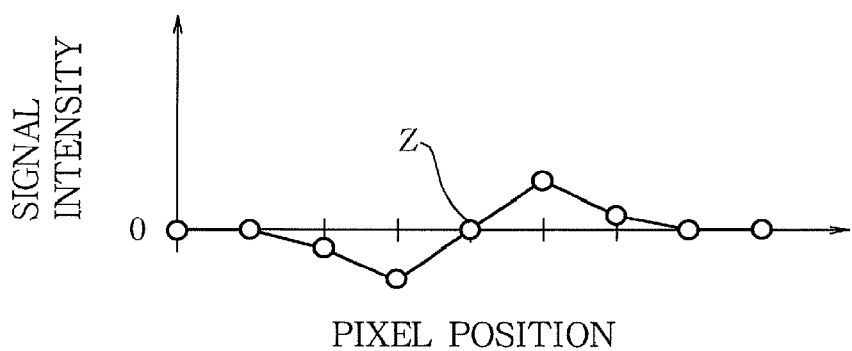

FIG. 12(A) shows a step edge and a sampling interval S1; FIG. 12(B) shows the signal obtained when the step edge is sampled with sampling interval S1; FIG. 12(C) shows the high-frequency component of the signal shown in FIG. 12(B). FIG. 13(A) shows a step edge and a sampling interval S2, which is longer than sampling interval S1; FIG. 13(B) shows the signal obtained when the step edge is sampled with sampling interval S2; FIG. 13(C) shows the high-frequency component of the signal shown in FIG. 13(B). In the description below, the length of sampling interval S2 is half the length of sampling interval S1.

As shown in FIGS. 12(C) and 13(C), the center of the step edge appears as a zero-crossing point Z in the signal representing the high-frequency component. The slope of the signal representing the high-frequency component near the zero-crossing point Z increases as the length of the sampling interval decreases, and the positions of the points that give the local maximum and local minimum values near the zero-crossing point Z approach the zero-crossing point Z as the length of the sampling interval decreases.

That is, a change in sampling interval does not change the position of the zero-crossing point in the signal representing the high-frequency component near the edge, but as the sampling interval decreases (or the resolution increases), the slope of the high-frequency component near the edge increases, and the position of the points that give the local maximum and minimum values approach the zero-crossing point.

FIGS. 14(A) to 14(F) are diagrams illustrating the operation of the first intermediate image generating means 1 and second intermediate image generating means 2 when the signal obtained by sampling the step edge with sampling interval S2 is enlarged to twice its size and then input to the image processing apparatus in the first embodiment. As described earlier, the processing in the first intermediate image generating means 1 and second intermediate image generating means 2 is performed in the horizontal direction and the vertical direction separately, and the processing is carried out one-dimensionally. Accordingly, in FIGS. 14(A) to 14(F), the processing is represented using one-dimensional signals.

Figure 14A:
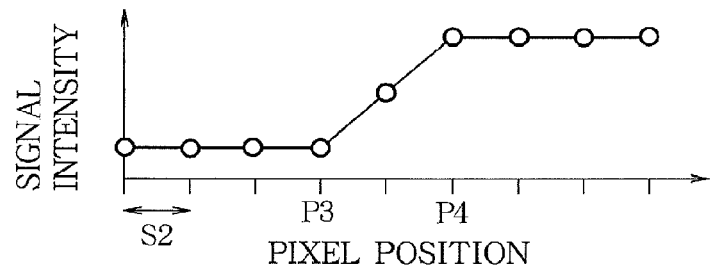
FIGS. 14(A) to 14(F) are diagrams indicating values of consecutive pixel signals to illustrate the operation of the first intermediate image generating means 1 and second intermediate image generating means 2 in FIG. 1.
Figure 14B:
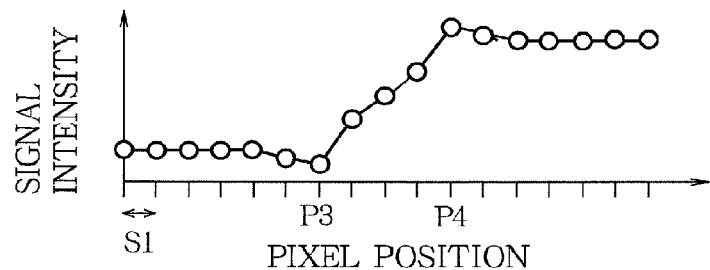

Like FIG. 13(B), FIG. 14(A) shows the signal obtained when the step edge is sampled with sampling interval S2. FIG. 14(B) shows a signal obtained by enlarging the signal shown in FIG. 14(A) to twice its size. That is, if the original image DORG includes an edge as shown in FIG. 14(A), a signal as shown in FIG. 14(B) is input as the input image DIN. When the signal is enlarged to twice its size, the sampling interval becomes half of its value before the enlargement. The sampling interval of the signal shown in FIG. 14(B) is therefore the same as sampling interval S1 in FIGS. 12(A) to 12(C). In FIG. 14(A), the position denoted by coordinate P3 is on the boundary of the low brightness side of the edge signal, and the position denoted by coordinate P4 is on the boundary of the high brightness side of the edge signal.

Figure 14C:
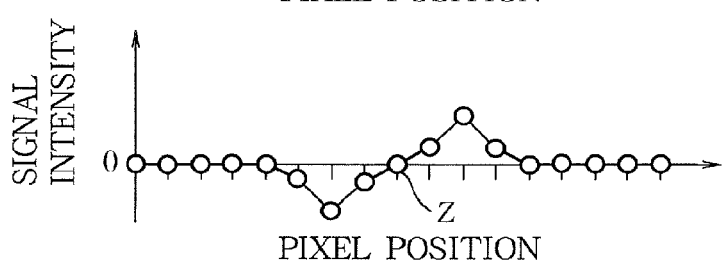

FIG. 14(C) shows a signal representing the high-frequency component of the signal shown in FIG. 14(B), that is, a signal corresponding to the image D1A output from high-frequency component image generating means 1A. Since image D1A is obtained by extracting the high-frequency component in the input image DIN, it also includes a fold-over component.

Figure 14D:
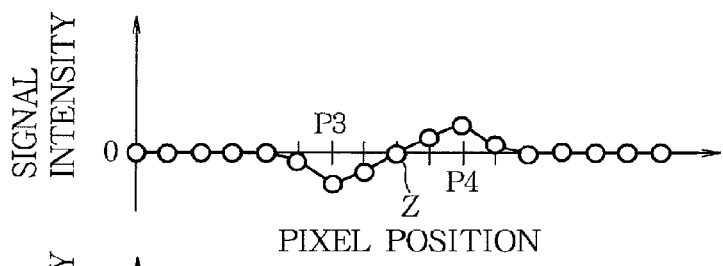

FIG. 14(D) shows a signal representing the low-frequency component of the signal shown in FIG. 14(C), that is, a signal corresponding to the image D1B output from the low-frequency component image generating means 1B. Since, as described earlier, image D1B is output as intermediate image D1, FIG. 14(D) also corresponds to intermediate image D1. In the vicinity of the zero-crossing point Z in intermediate image D1, a local minimum value appears at coordinate P3, and a local maximum value appears at coordinate P4, as shown in FIG. 14(D), matching the form of the high-frequency component extracted from the signal obtained by sampling the step edge at sampling interval S2 as shown in FIG. 13(C). The fold-over component is removed from image D1A by the low-pass filtering process performed by the low-frequency component image generating means 1B.

Figure 14E:
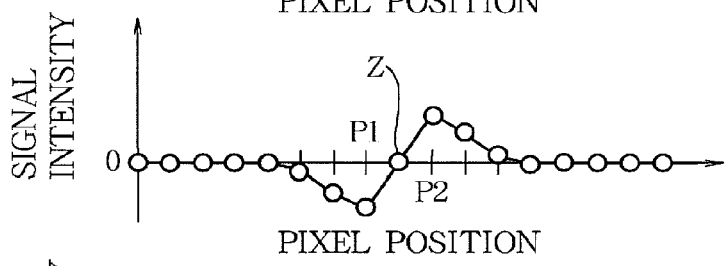

FIG. 14(E) represents the signal output when the signal shown in FIG. 14(D) is input to the non-linear processing means 2A, that is, it illustrates the image D2A output from the non-linear processing means 2A when intermediate image D1 is input. In the non-linear processing means 2A, the signal values at the coordinates P1 and P2 preceding and following the zero-crossing point are amplified. Therefore, the magnitudes of the signal values at coordinates P1 and P2 in image D2A become greater than the other values, as shown in FIG. 14(E); the position where the local minimum value appears near the zero-crossing point Z changes from coordinate P3 to coordinate P1, which is closer to the zero-crossing point Z; and the position where the local maximum value appears changes from coordinate P4 to coordinate P2, which is closer to the zero-crossing point Z. This means that the high-frequency component is generated by a non-linear process that amplifies the values of the pixels preceding and following the zero-crossing point Z in the non-linear processing means 2A. A high-frequency component can be generated in this way by changing the amplification factor appropriately for each pixel or by changing the content of the processing appropriately for each pixel. The non-linear processing means 2A has the effect of generating a high-frequency component which is not included in intermediate image D1, that is, a high-frequency component corresponding to the high-frequency region RH2 shown in FIG. 11(A).

Figure 14F:
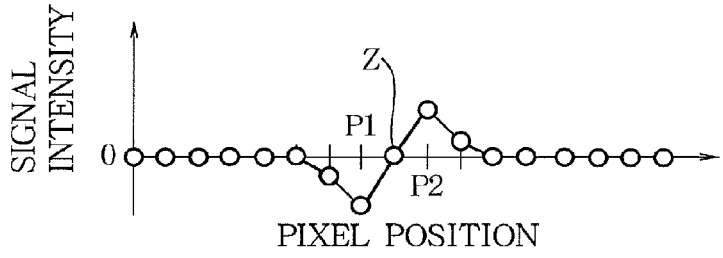

FIG. 14(F) shows a signal representing the high-frequency component of the signal shown in FIG. 14(E), that is, a signal corresponding to the image D2B output from high-frequency component image generating means 2B. In the vicinity of the zero-crossing point Z in image D2B, the local minimum value appears at coordinate P1 and the local maximum value appears at coordinate P2, as shown in FIG. 14(F), matching the form of the high-frequency component extracted from the signal obtained by sampling the step edge at sampling interval S1, shown in FIG. 12(C). This means that the high-frequency component generated in the non-linear processing means 2A is extracted by high-frequency component image generating means 2B and output as image D2B. It could also be said that the extracted image D2B is a signal including a frequency component corresponding to the sampling interval 51. In other words, high-frequency component image generating means 2B has the effect of extracting only the high-frequency component generated by the non-linear processing means 2A.

The adding means 4 adds intermediate image D1 and intermediate image D2 to the input image DIN to generate the output image DOUT. As described earlier, intermediate image D1 is obtained by excluding the fold-over component from the high-frequency component of the input image DIN, and corresponds to the high-frequency component near the Nyquist frequency of the original image DORG, as shown in FIG. 10(E). The spectral intensity near the Nyquist frequency of the original image DORG is weakened by the enlargement processing in the image enlarging means U1, as described with reference to FIG. 9(D). The weakening of the spectral intensity by the enlargement processing can be compensated for by adding intermediate image D1. Since the fold-over component has been excluded from intermediate image D1, spurious signals such as overshoot, jaggies, and ringing are not enhanced. Image D2, however, is the high-frequency component corresponding to sampling interval S1. Adding image D2 can accordingly supply a high-frequency component in the band at and above the Nyquist frequency of the original image DORG, so the perceived image resolution can be increased. Accordingly, by adding intermediate image D1 and intermediate image D2 to the input image DIN, a high-frequency component can be added without enhancing the fold-over component, and the perceived image resolution can be improved.

Supplying a high-frequency component in the band at and above the Nyquist frequency of the original image DORG can increase the perceived image resolution, so the perceived image resolution can be improved even if only intermediate image D2 is added to the input image DIN in the adding means 4. That is, instead of adding both the first intermediate image D1 and the second intermediate image D2 to the input image DIN as in FIG. 1, only the second intermediate image D2 may be added.

In addition, in the image processing apparatus in the first embodiment, the first intermediate image generating means 1 and the second intermediate image generating means 2 perform image processing in the horizontal direction and the vertical direction in parallel. Accordingly, the effects described above can be obtained not just in the horizontal or vertical direction but in any direction.

Considered in the frequency domain, the image processing apparatus in the first embodiment generates an image D2B corresponding to a high-frequency component near the Nyquist frequency ±Fn of the input image DIN on the basis of a component in the input image DIN near half the Nyquist frequency of the original image DORG, ±Fn/2, (or in a particular frequency band), in a frequency band from the origin to Fn. Even if the frequency component near the Nyquist frequency ±Fn has been lost in the input image DIN, accordingly, a frequency component near the Nyquist frequency ±Fn can be supplied by image D2B.

The location used as the particular frequency band is not limited to the vicinity of ±Fn/2. The frequency band to be used can be changed by suitably changing the frequency responses of high-frequency component image generating means 1A and low-frequency component image generating means 1B.

In the description given above, image enlargement processing is given as an example in which a frequency component near the Nyquist frequency Fn is lost, but that is not the only cause of the loss of frequency components near the Nyquist frequency Fn in the input image DIN; noise elimination and various other causes can also be considered. Therefore, the use of the image processing apparatus in the embodiments is not limited to processing following an image enlargement process.

Second Embodiment

Figure 15:
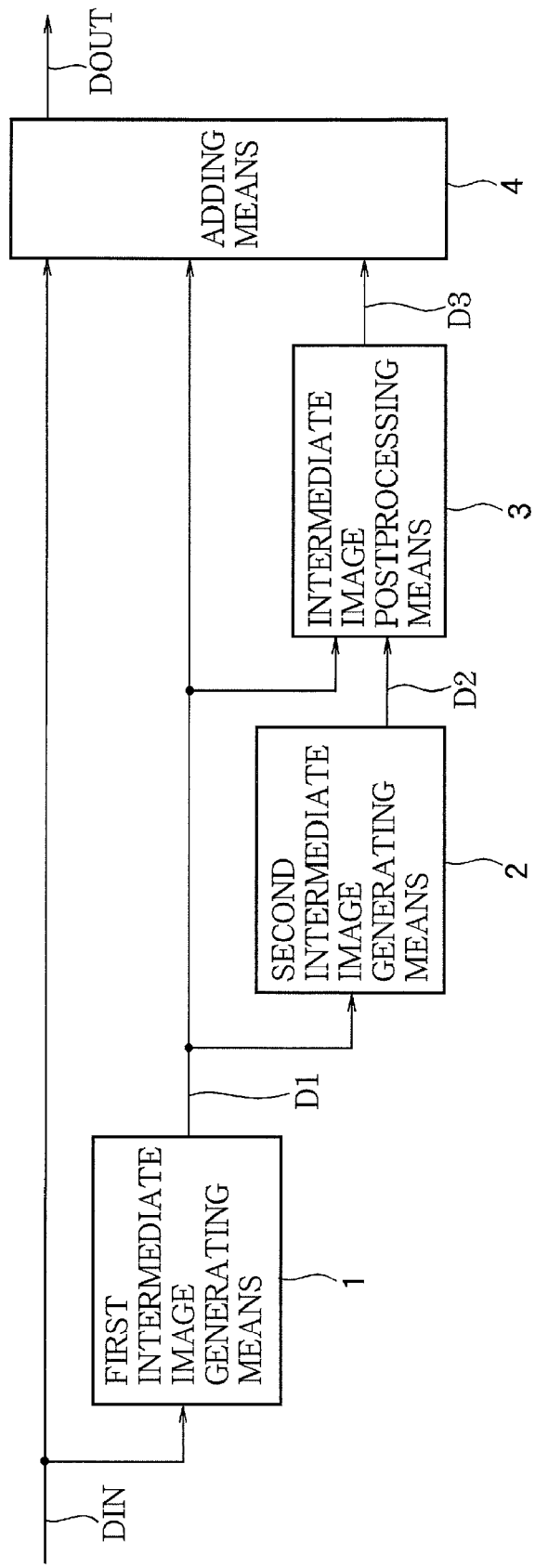
FIG. 15 is a block diagram illustrating the structure of an image processing apparatus according to a second embodiment of the invention.

FIG. 15 is a block diagram illustrating the structure of an image processing apparatus according to a second embodiment of the invention; the image processing apparatus can be utilized as, for example, part of an image display apparatus.

The image processing apparatus shown in FIG. 15 is generally similar to the image processing apparatus shown in FIG. 1, but differs in that an intermediate image postprocessing means 3 is inserted, and the adding means adds a third intermediate image D3, instead of the second intermediate image D2, to the input image DIN and the first intermediate image D1.

The first intermediate image generating means 1 is structured, for example, as shown in FIG. 2, similar to the first intermediate image generating means 1 in the first embodiment, and operates similarly to the first intermediate image generating means 1 in the first embodiment to generate an intermediate image (the first intermediate image) D1 by extracting a frequency component in a vicinity of a particular frequency band from the input image DIN.

The second intermediate image generating means 2 is structured, for example, as shown in FIG. 3, similar to the second intermediate image generating means 2 in the first embodiment, and operates similarly to the second intermediate image generating means 2 in the first embodiment to generate an intermediate image D2 (the second intermediate image) by carrying out certain processing, which will be described later, on intermediate image D1.

The intermediate image postprocessing means 3 generates an intermediate image D3 (the third intermediate image) in which processing described below has been carried out on the second intermediate image D2.

The adding means 4 adds the input image DIN, the first intermediate image D1, and the third intermediate image D3. The image obtained as the resulting sum by the adding means 4 is output as an output image DOUT.

Figure 16:
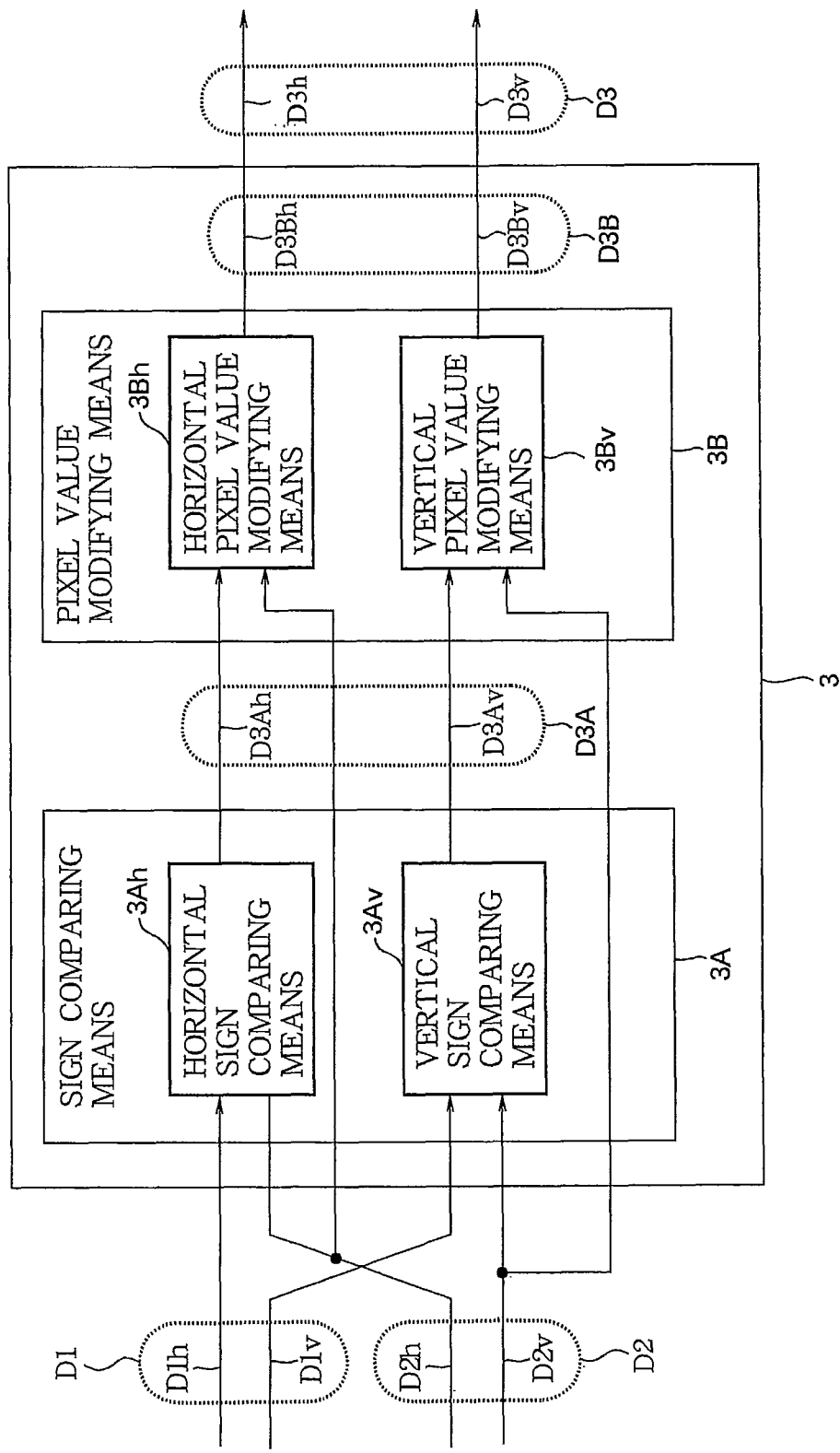
FIG. 16 is a block diagram illustrating an exemplary structure of the intermediate image postprocessing means 3 in FIG. 15.

FIG. 16 shows an exemplary structure of the intermediate image postprocessing means 3; the illustrated intermediate image postprocessing means 3 includes a sign comparing means 3A that compares the signs of pixel values in the first intermediate image intermediate image D1 and second intermediate image D2 and outputs the results of the comparison as a signal D3A, and a pixel value modifying means 3B that outputs an image D3B in which the pixel values in intermediate image D2 are modified on the basis of signal D3A. Image D3B is output from the intermediate image postprocessing means 3 as image D3.

The operation of the intermediate image postprocessing means 3 will be described in detail below.

First, the sign comparing means 3A in the intermediate image postprocessing means 3 compares the pixel values of intermediate image D1 and intermediate image D2, and outputs the results as signal D3A. The comparison of signs is carried out both on the pixels of image D1h and image D2h (on pixels in the same position in both images) and on the pixels of image D1v and image D2v (on pixels in the same position in both images). The intermediate image postprocessing means 3 includes a horizontal sign comparing means 3Ah and a vertical sign comparing means 3Av; the horizontal sign comparing means 3Ah compares the signs of the pixels in image D1h and image D2h and outputs the results as a signal D3Ah; the vertical sign comparing means 3Av compares the signs of the pixels in image D1v and image D2v and outputs the results as a signal D3Av. Signal D3Ah and signal D3Av are output as signal D3A.

The operation of the sign comparing means 3A will now be described in further detail.

FIGS. 17(A) to 17(D) represent images D1h, D1v, D2h, and D2v; FIG. 17(A) represents image D1h, FIG. 17(B) represents image D1v, FIG. 17(C) represents image D2h, and FIG. 17(A) represents image D2v. The horizontal coordinates, vertical coordinates, and coordinate values in FIGS. 17(A) to 17(D) match the horizontal and vertical directions in the images. In image D1h, the pixel value of the pixel at the position with horizontal coordinate x and vertical coordinate y is denoted by the symbol D1h(xy); in image D1v, the pixel value of the pixel at the position with horizontal coordinate x and vertical coordinate y is denoted by the symbol D1v(xy); in image D2h, the pixel value of the pixel at the position with horizontal coordinate x and vertical coordinate y is denoted by the symbol D2h(xy); in image D2v, the pixel value of the pixel at the position with horizontal coordinate x and vertical coordinate y is denoted by the symbol D2v(xy).

The horizontal sign comparing means 3Ah compares the signs of the values of pixels with the same coordinates in image D1h and image D2h. The signs of pixel value D1h(11) and D2h(11) are compared, the signs of pixel value D1h(12) and D2h(12) are compared, and in general, the signs of pixel value D1h(xy) and D2h(xy) are compared, comparing the signs of pixel values at the same coordinates; agreement or disagreement of the signs of the pixel values of each pixel is tested, and the results are output as a signal D3Ah. The vertical sign comparing means 3Av also compares the signs of the values of pixels with the same coordinates in image D1v and image D2v. The signs of pixel value D1v(11) and D2v(11) are compared, the signs of pixel value D1v(12) and D2v(12) are compared, and in general, the signs of pixel value D1v(xy) and D2v(xy) are compared, comparing the signs of pixel values at the same coordinates; agreement or disagreement of the signs of the pixel values of each pixel is tested, and the results are output as a signal D3Av. Signal D3Ah and signal D3Av are output from the intermediate image postprocessing means 3 as signal D3A.

The sign comparing means 3A operates as described above.

The pixel value modifying means 3B generates image D3B by modifying the pixel values in intermediate image D2 on the basis of signal D3A. Of the pixel values in intermediate image D2, the pixel value modifying means 3B sets the pixel values indicated by signal D3A to differ in sign from the pixel values in intermediate image D1 to zero. When the signs match, intermediate image D2 is output without change. This process is carried out on both image D2h and image D2v.

The pixel value modifying means 3B comprises a horizontal pixel value modifying means 3Bh and a vertical pixel value modifying means 3Bv.

The horizontal pixel value modifying means 3Bh receives image D2h and signal D3Ah and outputs an image D3Bh with pixel values that are set to zero when signal D3A indicates that the signs do not match, image D2h being output without change as image D3Bh when signal D3Ah indicates that the signs match.

The vertical pixel value modifying means 3Bv receives image D2v and signal D3Av and outputs an image D3Bv with pixel values that are set to zero when signal D3Av indicates that the signs do not match, image D2v being output without change as image D3Bv when signal D3Av indicates that the signs match.

Image D3Bh and image D3Bv are output from the pixel value modifying means 3B as image D3B.

Image D3B is then output from the intermediate image postprocessing means 3 as image D3. Image D3 includes an image D3h corresponding to image D3Bh and an image D3v corresponding to image D3Bv.

Finally the operation of the adding means 4 will be described. As stated above, the adding means 4 adds the input image DIN, intermediate image D1, and intermediate image D3 together to generate the output image DOUT. The output image DOUT is output from the image processing apparatus as the final output image.

Intermediate image D1 includes image D1h and image D1v and intermediate image D3 includes image D3h and image D3v, so to add the input image DIN, intermediate image D1, and intermediate image D3 together means to add all of images D1h, D1v, D3h, and D3v to image DIN.

As stated in the first embodiment, the addition process performed by the adding means 4 is not limited to simple addition; weighted addition may be performed instead. Each of the images D1h, D1v, D3h, and D3v may be amplified by a different amplification factor before being added to the input image DIN.

An example in which the image processing apparatus in the second embodiment is utilized as part of an image display apparatus will now be described. The description will clarify the effects of the image processing apparatus in the second embodiment. Unless otherwise specified, Fn will denote the Nyquist frequency of the input image DIN in the description below.

The image display apparatus in which the image processing apparatus in the second embodiment is utilized displays an image corresponding to the original image DORG on a monitor U3 as illustrated in FIG. 6 and described in relation to the first embodiment.

The image enlarging means U1 operates as described with reference to FIGS. 6 to 9 in relation to the first embodiment.

The image processing apparatus U2 of the second embodiment outputs an image DU2 obtained by performing the processing described above on image DU1. Image DU2 is displayed on the monitor U3.

The operation and effects of the first intermediate image generating means 1 and second intermediate image generating means 2 in the second embodiment are as described with reference to FIGS. 9A to 9D and 10A to 10E in relation to the first embodiment.

As described in relation to the first embodiment, the non-linear processing means 2A in the second intermediate image generating means 2 has the function of generating a high-frequency component corresponding to the high-frequency region RH2, and the high-frequency component image generating means 2B has the function of extracting only the high-frequency component generated by the non-linear processing means 2A. Since image D2B is output as image D2, the second intermediate image generating means 2 can output an intermediate image D2 having a high-frequency component corresponding to sampling interval S1.

Figure 18A:
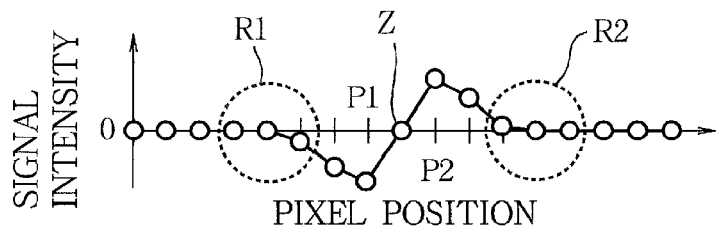
FIGS. 18(A) to 18(E) are diagrams representing the more precise form of intermediate image D2 and the operation of the intermediate image postprocessing means 3.
Figure 18B:
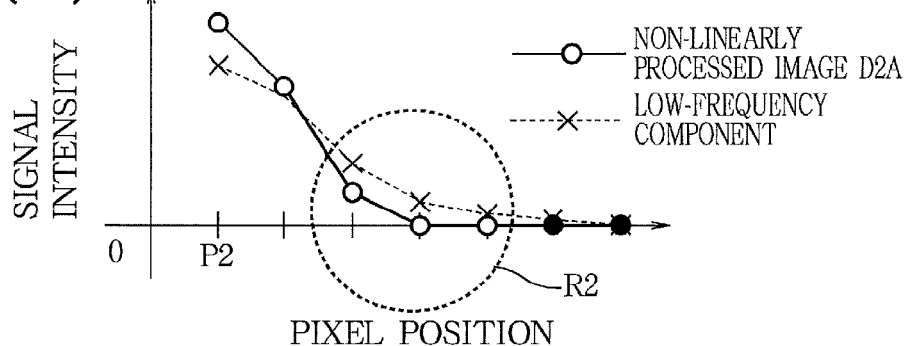
Figure 18C:
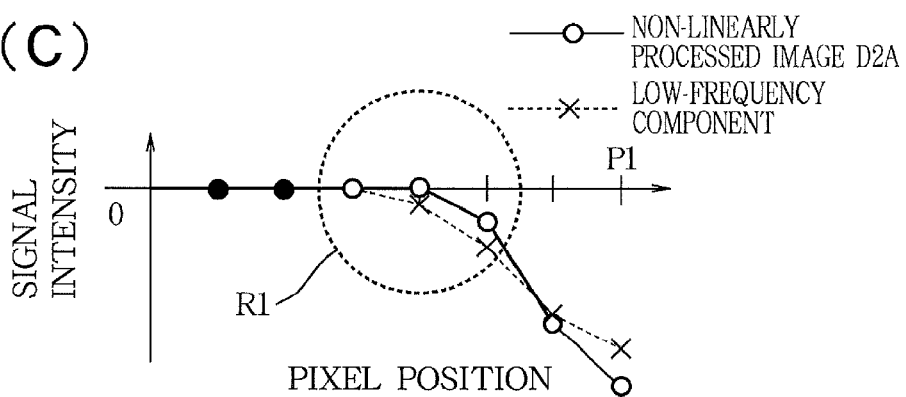
Figure 18D:
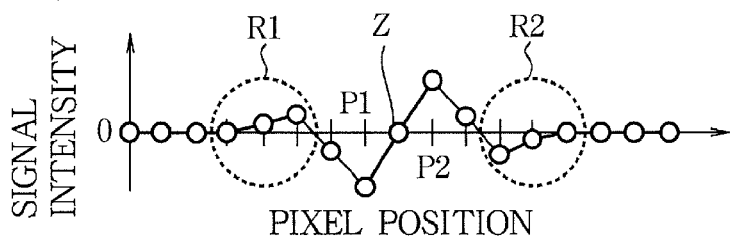
Figure 18E:
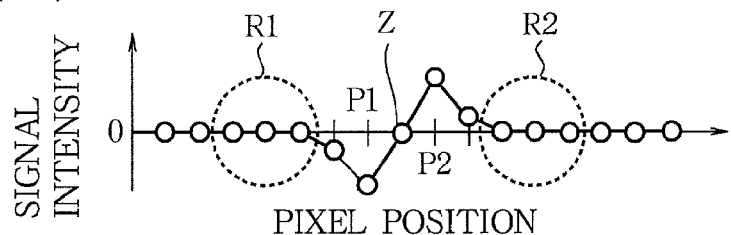
Figure 19:
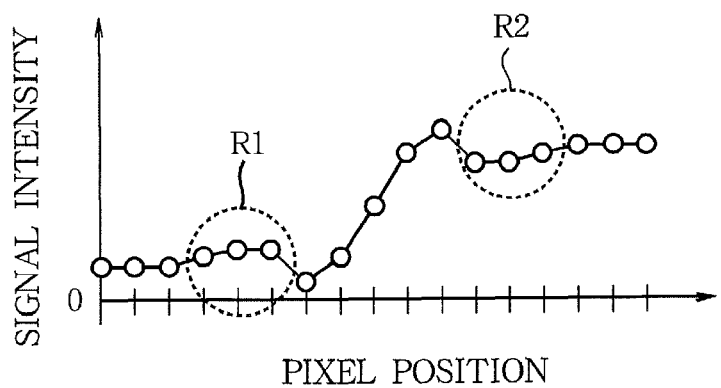
FIGS. 19(A) and 19(B) are diagrams representing the effect of the intermediate image postprocessing means 3.
Figure 19:
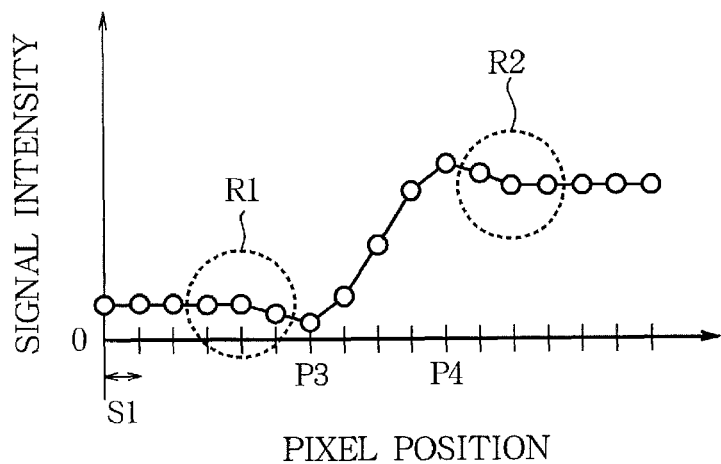

FIGS. 18(A) to 18(E) and 19(A) and 19(B) are diagrams illustrating the operation and effect of the intermediate image postprocessing means 3. FIGS. 18(A) to 18(E) are diagrams illustrating the more precise form of image D2B or intermediate image D2 and the operation of the intermediate image postprocessing means 3; FIGS. 19(A) and 19(B) are diagrams illustrating the effect of the intermediate image postprocessing means 3. These diagrams will be used to describe operation and effect of the intermediate image postprocessing means 3 below.

FIG. 18(A) schematically shows the non-linearly processed image D2A output from the non-linear processing means 2A in the second intermediate image generating means 2, showing in particular the non-linearly processed image D2A in the vicinity of a zero-crossing point Z.

FIG. 18(B) shows the non-linearly processed image D2A in the region R2 shown in FIG. 18(A): the data shown as white circles with a solid line represent the non-linearly processed image D2A; the data shown as x's with a dotted line represent the low-frequency component of the non-linearly processed image D2A.

Local weighted averages of the pixel values of the non-linearly processed image D2A are calculated as the low-frequency component of the non-linearly processed image D2A. In the vicinity of region R2, although some of the pixel values are positive, most of them are zero, so the values of the low-frequency component are slightly greater than zero. Compared with the pixel values of the non-linearly processed image D2A, the values of the low-frequency component are slightly greater. Near coordinate P2, however, since the pixel values of the pixels at positions other than coordinate P2 in the non-linearly processed image D2A take smaller values than the pixel value of the pixel at coordinate P2, the values of the low-frequency component are less than the pixel values of the non-linearly processed image D2A. Consequently, the magnitude relationship between the pixel values of the non-linearly processed image D2A and the values of the low-frequency component reverses between the vicinity of region R2 and the vicinity of coordinate P2.

FIG. 18(C) shows the non-linearly processed image D2A in the region R1 shown in FIG. 18(A): the data shown as white circles with a solid line represent the non-linearly processed image D2A; the data shown as x's with a dotted line represent the low-frequency component of the non-linearly processed image D2A.

Local weighted averages of the pixel values of the non-linearly processed image D2A are calculated as the low-frequency component of the non-linearly processed image D2A. In the vicinity of region R1, although some of the pixel values are negative, most of them are zero, so the values of the low-frequency component are slightly less than zero (negative values with slightly greater absolute values). Compared with the pixel values of the non-linearly processed image D2A, the values of the low-frequency component are slightly less. Near coordinate P1, however, since the pixel values of the pixels at positions other than coordinate P1 in the non-linearly processed image D2A take greater values (negative values with slightly smaller absolute values) than the pixel value of the pixel at coordinate P1, the values of the low-frequency component are greater than the pixel values of the non-linearly processed image D2A. Consequently, the magnitude relationship between the pixel values of the non-linearly processed image D2A and the values of the low-frequency component reverses between the vicinity of region R1 and the vicinity of coordinate P1.

FIG. 18(D) schematically represents the image D2B output from the high-frequency component image generating means 2B in the second intermediate image generating means 2. Image D2B is obtained by taking the high-frequency component from the non-linearly processed image D2A; to take the high-frequency component from the non-linearly processed image D2A, it suffices to subtract the low-frequency component from the non-linearly processed image D2A. The difference between the non-linearly processed image D2A shown in FIGS. 18(B) and 18(C) is image D2B. As explained above, in the vicinity of region R1 the non-linearly processed image D2A has greater values than the low-frequency component, in the vicinity of coordinate P1 the low-frequency component has greater values than the non-linearly processed image D2A, in the vicinity of coordinate P2 the non-linearly processed image D2A has greater values than the low-frequency component, and in the vicinity of region R2, the low-frequency component has greater values than the non-linearly processed image D2A, so if the values of image D2B in the vicinity of region R1, in the vicinity of coordinate P1, in the vicinity of coordinate P2, and in the vicinity of region R2 are taken in this order, the values change positive to negative, with a local minimum at coordinate P1, then change from negative to positive. After a local maximum at coordinate P2, the values change from positive to negative. Since image D2B is output as intermediate image D2, similar changes occur in intermediate image D2.

If the changes in the pixel values of intermediate image D1 at the same location are examined, there is only a single change from negative to positive. Accordingly, if intermediate image D1 and intermediate image D2 are compared, they are found to have opposite signs in the vicinities of region R1 and region R2.

FIG. 18(E) schematically represents the intermediate image D3 output from the intermediate image postprocessing means 3. The signs of intermediate image D1 and intermediate image D2 are compared by the sign comparing means 3A in the intermediate image postprocessing means 3, and where their signs are reversed, the relevant pixel values of intermediate image D2 are set to zero by the pixel value modifying means 3B. Where the signs are the same, the pixel values of intermediate image D2 are output without alteration as the pixel values of image D3. The disagreement in sign between intermediate image D1 and intermediate image D2 in the vicinities of regions R1 and R2 is accordingly removed. As a result, an intermediate image D3 is obtained in which the local minimum and local maximum values at coordinates P1 and P2 are preserved, but the disagreement with intermediate image D1 in the signs in the vicinities of regions R1 and R2 are removed.

The local minimum and local maximum values near the zero crossing point Z are maintained in the pixels in intermediate image D3 at the positions expressed by coordinates P1 and P2. This means that the high-frequency component generated by the second intermediate image generating means 2, corresponding to sampling interval S1, is preserved in intermediate image D3. The intermediate image postprocessing means 3 therefore has the effect of removing the disagreement in positive and negative sign with intermediate image D1 while preserving the high-frequency component corresponding to sampling interval S1 generated by the second intermediate image generating means 2.

FIG. 19(A) schematically represents the image obtained by adding intermediate image D1 and intermediate image D2 to the input image DIN in the vicinity of an edge. As stated above, the pixel values of intermediate image D1 and intermediate image D2 have opposite signs in the vicinities of regions R1 and R2.

To take region R1, for example, the values in intermediate image D1 are negative, so it has the effect of enhancing the edge by reducing the pixel values in the input image DIN, but the values in intermediate image D2 are positive, so the edge cannot be enhanced by adding intermediate image D2. Furthermore, if the values added by intermediate image D2 are greater than the values subtracted by intermediate image D1 (if the absolute values in intermediate image D2 are greater than the absolute values in intermediate image D1), then the pixel values in the vicinity of region R1 become slightly greater than the surrounding values, as shown in FIG. 19(A).

To take region R2, for example, the values in intermediate image D1 are positive, so it has the effect of enhancing the edge by increasing the pixel values in the input image DIN, but the values in intermediate image D2 are negative, so the edge cannot be enhanced by adding intermediate image D2. Furthermore, if the values subtracted by intermediate image D2 are greater than the values added by intermediate image D1 (if the absolute values in intermediate image D2 are greater than the absolute values in intermediate image D1), then the pixel values in the vicinity of region R2 become slightly smaller than the surrounding values, as shown in FIG. 19(A).

Disagreement of the positive/negative signs of intermediate image D1 and intermediate image D2 thus gives rise to unnatural brightness variations in the vicinity of an edge. An edge normally has a certain length in a certain direction such as the horizontal direction or vertical direction in the image, so the unnatural brightness variations also have a certain length over which they appear beside the edge; the result is that unnatural lines or patterns are seen near the edge.

FIG. 19(B) schematically represents the image obtained when intermediate image D1 and intermediate image D3 are added to the input image DIN. As stated above, the pixel values of intermediate image D1 and intermediate image D3 have matching positive or negative signs. The edge can accordingly be enhanced without the appearance of unnatural brightness variations near regions R1 and R2 by adding intermediate image D1 and intermediate image D3 to the input image DIN.

In other words, by adding intermediate image D1 and intermediate image D3 to the input image DIN in the adding means 4, it is possible to enhance the image without causing unnatural brightness variations.

As also stated above, intermediate image D1 is obtained by removing the fold-over component from the high-frequency component of the input image DIN, and corresponds to a high-frequency component in a vicinity of the Nyquist frequency of the original image DORG as shown in FIG. 10(E). The spectral intensity in the vicinity of the Nyquist frequency of the original image DORG is weakened by the enlargement processing in the image enlarging means U1, as described with reference to FIG. 9(D), but the weakening of the spectral intensity by the enlargement processing can be compensated for by adding intermediate image D1. Since the fold-over component has been excluded from intermediate image D1, spurious signals such as overshoot, jaggies, and ringing are not enhanced. Intermediate image D3, however, is a high-frequency component corresponding to sampling interval S1. Adding image D3 can accordingly supply a high-frequency component in a band at and above the Nyquist frequency of the original image DORG, so the perceived image resolution can be increased. Accordingly, by adding intermediate image D1 and intermediate image D3 to the input image DIN in the adding means 4, a high-frequency component can be added without enhancing the fold-over component, and the perceived image resolution can be improved. In other words, a high-frequency component can be added to increase the perceived resolution of the image while suppressing an increase in overshoot, jaggies, ringing, and the like due to the fold-over component.

In addition, in the image processing apparatus in the second embodiment, the first intermediate image generating means 1 and the second intermediate image generating means 2 perform image processing in the horizontal direction and the vertical direction in parallel. Accordingly, the effects described above can be obtained not just in the horizontal or vertical direction but in any direction.

Considered in the frequency domain, in the frequency band from the origin to Fn, the image processing apparatus in the second embodiment generates an image D2B corresponding to a high-frequency component near the Nyquist frequency $\pm Fn$ of the input image DIN on the basis of a component in the input image DIN near half the Nyquist frequency of the original image DORG, $\pm Fn/2$, (or in a particular frequency band). Even if a frequency component near the Nyquist frequency $\pm Fn$ has been lost in the input image DIN, accordingly, a frequency component near the Nyquist frequency $\pm Fn$ can be supplied by image D2B.

The location used as the particular frequency band is not limited to the vicinity of $\pm Fn/2$. The frequency band to be used can be changed by suitably changing the frequency responses of high-frequency component image generating means 1A and low-frequency component image generating means 1B.

In the description given above, image enlargement processing is given as an example in which a frequency component near the Nyquist frequency Fn are lost, but that is not the only cause of the loss of frequency components near the Nyquist frequency Fn in the input image DIN; noise elimination and various other causes can also be considered. Therefore, the use of the image processing apparatus in the second embodiment is not limited to processing following an image enlargement process.

Third Embodiment

Figure 20:
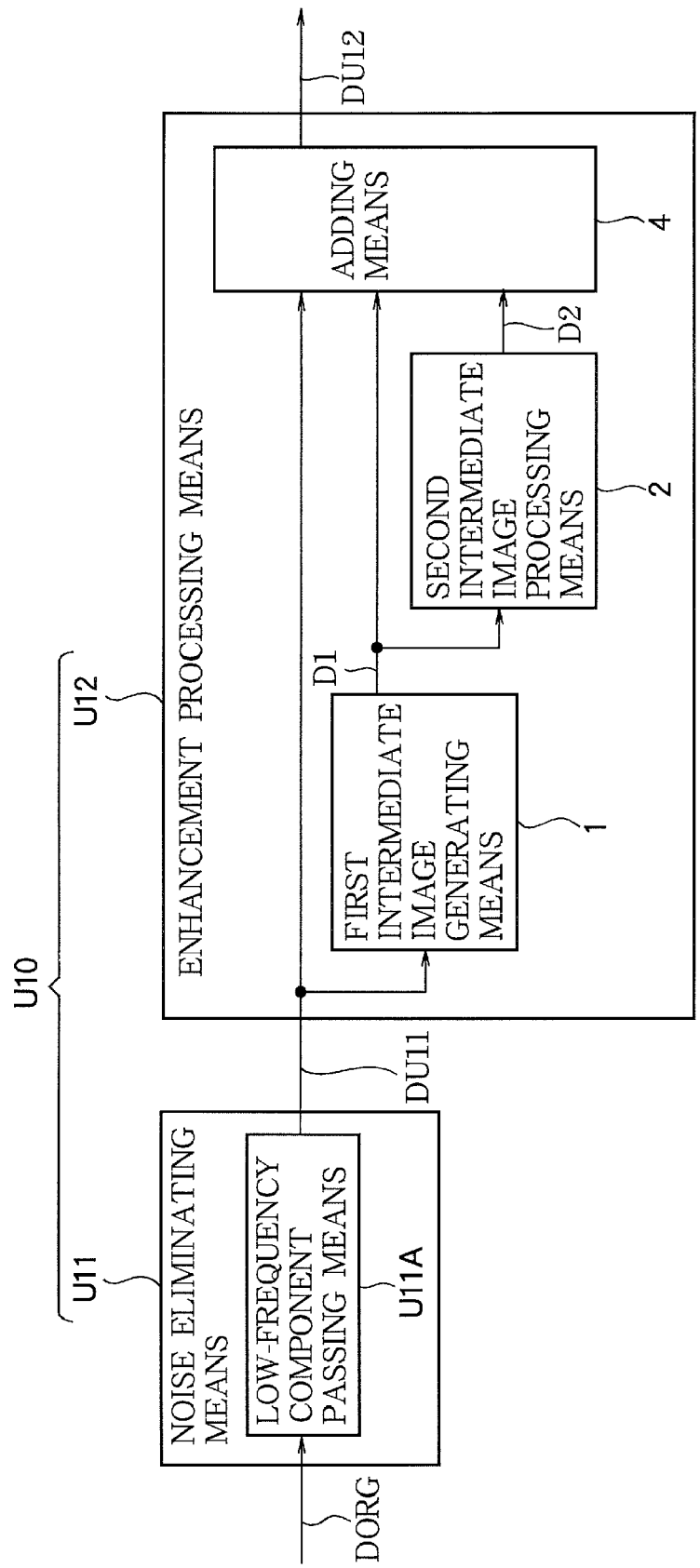
FIG. 20 is a block diagram illustrating the structure of the image processing apparatus according to a third embodiment of the invention.

FIG. 20 shows the image processing apparatus in a third embodiment of the invention. The illustrated image processing apparatus inputs an original image DORG and outputs an image DOUT; the apparatus includes a noise eliminating means U11 and an enhancement processing means U12, and can be utilized as, for example, part of an image display apparatus. The noise eliminating means U11 and enhancement processing means U12 constitute the image processing apparatus U10 in the third embodiment.

The noise eliminating means U11 internally includes a low-frequency component passing means U11A; the noise eliminating means U11 eliminates noise included in the original image DORG by a method described later, and outputs a noise-eliminated image DU11 from which noise has been eliminated.

The image processing apparatus in the first embodiment, for example, may be used as the enhancement processing means U12. The enhancement processing means U12 then includes a first intermediate image generating means 1, a second intermediate image generating means 2, and an adding means 4, as illustrated, and carries out enhancement processing on the noise-eliminated image DU11 by a method described later to output an enhanced processed image DU12.

The enhanced processed image DU12 is output to the exterior of the image processing apparatus in the third embodiment.

First, the operation of the noise eliminating means U11 will be described.

The noise eliminating means U11 internally includes a low-frequency component passing means U11A. The low-frequency component passing means U11A includes a low-pass filter. The noise eliminating means U11 uses the low-pass filter to eliminate noise from the original image DORG and outputs the noise-eliminated image DU11.

When there are irregularly oscillating components in an image, they generally appear as noise. These irregular oscillating components usually have high frequencies, which are rejected by the low-pass filter. It is therefore possible to use the low-pass filter to eliminate noise.

Next, the detailed operation of the U12 will be described.

The enhancement processing means U12 has, for example, the same internal configuration as the image processing apparatus in the first embodiment, and operates in the same way. As the input image DIN in FIG. 1, however, it inputs the output DU11 of the noise eliminating means U11.

The effects of the image processing apparatus according to the third embodiment are described below.

First, the effects of the noise eliminating means U11 will be described.

Figure 21:
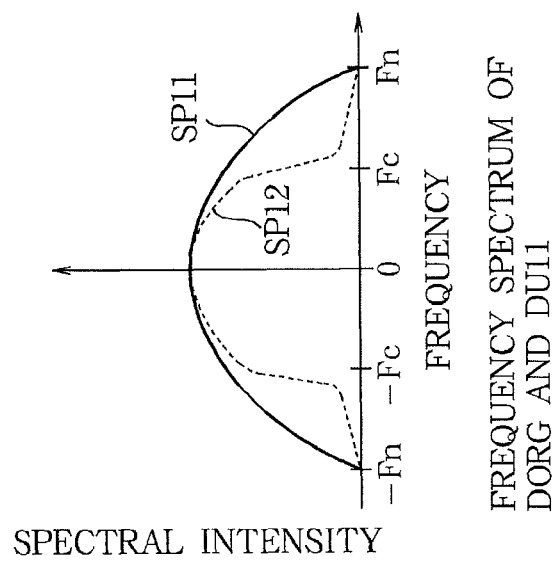
FIGS. 21(A) and 21(B) are diagrams showing frequency responses and frequency spectra to illustrate the operation of the low frequency passing means U2A constituting the noise eliminating means U11.
Figure 21:
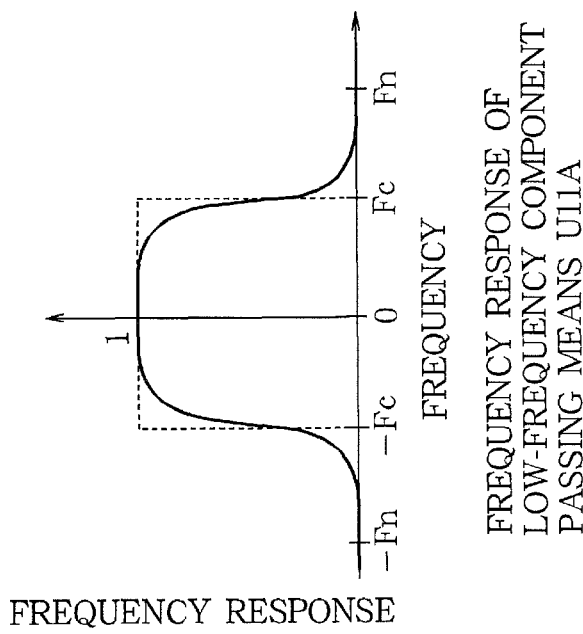

FIGS. 21(A) and 21(B) represent the effect of the processing carried out by the noise eliminating means U11 in the frequency domain: FIG. 21(A) represents the frequency response of the low-frequency component passing means U11A; FIG. 2(B) represents the frequency spectra of the original image DORG and the noise-eliminated image DU11. The horizontal axis in FIGS. 21(A) and 21(B) is a frequency axis representing spatial frequency in the horizontal direction, and the vertical axis represents the frequency spectrum or frequency response.

To simplify the notation in FIGS. 21(A) and 21(B), only a single frequency axis is used, as explained in relation to FIGS. 9(A) to 9(D).

First the frequency response of the low-frequency component passing means U11A will be described. Ideally, the frequency response of the low-frequency component passing means U11A is shown by the dotted line in FIG. 21(A): the response is 0 when the absolute frequency value is greater than a particular value Fc, and is 1 in other places. Because of factors such as the limited computational precision of the low-frequency component passing means U11A and the limited number of taps, the ideal frequency response is unattainable; the actual frequency response is as shown by the solid line. When the absolute frequency value is slightly less than Fc the frequency response has a value slightly less than 1, and in the region where the absolute frequency value is greater than Fc the frequency response has a value slightly greater than 0.

Next, the frequency spectrum of the original image DORG will be described. The image input as the original image DORG is generally a natural image and its spectral intensity is concentrated around the origin of the frequency space. The frequency spectrum of the original image DORG accordingly resembles spectrum SP11 in FIG. 21(B).

Next the spectrum SP12 of the noise-eliminated image DU11 will be described. The noise-eliminated image DU11 is generated by performing a low-pass filtering process on the original image DORG by use of the low-frequency component passing means U11A, which has the frequency response shown by the solid line in FIG. 21(A). The spectrum SP12 of the noise-eliminated image DU11 in each frequency band will be described below.

First, in the region in which the absolute frequency value is slightly less than Fc, since the frequency response of the low-frequency component passing means U11A has a value slightly less than 1, the spectrum SP12 of the noise-eliminated image DU11 has values slightly less than those of the spectrum SP11 of the original image DORG.

Next, in the region in which the absolute frequency value is greater than Fc, since the frequency response of the low-frequency component passing means U11A has a value slightly greater than zero (substantially zero), there is more spectral loss than in the region in which the absolute frequency value is near Fc. The intensity of the spectrum SP12 of the noise-eliminated image DU11 is accordingly even smaller than in the region in which the absolute frequency value is slightly less than Fc.

The frequency spectrum SP12 of the noise-eliminated image DU11 has been described above; of the frequency components of the original image DORG, the spectral intensity on the high-frequency side is weakened by the noise eliminating means U11. The noise eliminating means U11 thus regards components with absolute frequency values greater than Fc as noise and weakens their intensity. It is known, however, that the perceived resolution of an image is reduced when its spectral intensity on the high-frequency side is weakened. Accordingly, while the noise eliminating means U11 has the effect of eliminating noise, it also reduces the perceived resolution of the image.

The above are the effects of the noise eliminating means U11.

Next, the effects of the enhancement processing means U12 will be described. The effects of the enhancement processing means U12 are similar to the effects of the image processing apparatus in the first embodiment, but the input image DIN differs from the input image in the first embodiment, leading to differences that will be understood from the description below.

FIGS. 22(A) to (E) are diagrams schematically representing the effect of generating the first intermediate image D1 from the input image DIN when the noise-eliminated image DU11 is input as the input image DIN: FIG. 22(A) represents the frequency spectrum of the input image DIN; FIG. 22(B) represents the frequency response of high-frequency component image generating means 1A; FIG. 22(C) represents the frequency response of the low-frequency component image generating means 1B; FIG. 22(D) represents the frequency response of the first intermediate image generating means 1; FIG. 22(E) represents the frequency spectrum of the first intermediate image D1. FIGS. 22(A) to 22(E) use just a single frequency axis for the same reason as in FIGS. 21(A) to 21(D).

In FIGS. 22(A) to (E), the intensity value of the frequency spectrum or frequency response is shown only in the range where the spatial frequency is zero or greater, for the same reason as in FIGS. 10(A) to 10(E).

First the frequency spectrum of the input image DIN will be described. Because a low-pass filtering process with the frequency response indicated by the solid line in FIG. 21(A) has been applied to the original image DORG, the frequency spectrum SP12 of the input image DIN is slightly weaker than the frequency spectrum SP11 of the original image DORG in regions where the absolute frequency value is less than Fc (or in the vicinity of Fc), and much of the spectral intensity is lost in regions where the absolute frequency value is Fc or greater.

Next the frequency response of high-frequency component image generating means 1A will be described. Since high-frequency component image generating means 1A is implemented by a high-pass filter, its frequency response decreases as the frequency decreases, as shown in FIG. 22(B). Here high-frequency component image generating means 1A passes mainly frequencies in the region where the absolute frequency value is greater than a value Fd slightly less than Fc.

Next the frequency response of the low-frequency component image generating means 1B will be described. Since the low-frequency component image generating means 1B is implemented by a low-pass filter, its frequency response decreases as the frequency increases, as shown in FIG. 22(C). Here the low-frequency component image generating means 1B passes mainly frequencies in the region where the absolute frequency value is less than a value Fe slightly greater than Fc.

Next the frequency response of the first intermediate image generating means 1 will be described. Among the frequency components of the input image DIN, the frequency component in the low-frequency region RL1 shown in FIG. 22(D), where the absolute frequency value is less than Fd, is weakened by the high-frequency component image generating means 1A in the first intermediate image generating means 1. The frequency component in the high-frequency region RH1 shown in FIG. 22(D), where the absolute frequency value is greater than Fe, is weakened by the low-frequency component image generating means 1B in the first intermediate image generating means 1. Therefore, as shown in FIG. 22(D), the frequency response of the first intermediate image generating means 1 has a peak in an intermediate region RM1 bounded by the low-frequency region RL1 and the high-frequency region RH1.

Next the frequency spectrum of intermediate image D1 will be described. The first intermediate image D1 shown in FIG. 22(E) is obtained by passing the input image DIN having the frequency spectrum shown in FIG. 22(A) through the first intermediate image generating means 1 having the frequency response shown in FIG. 22(D). Since the frequency response of the first intermediate image generating means 1 peaks in the intermediate region RM1 limited by the low-frequency region RL1 and the high-frequency region RH1, the frequency spectrum of the first intermediate image D1 is the frequency spectrum of the input image DIN with attenuation of the parts included in the low-frequency region RL1 and high-frequency region RH1. The first intermediate image D1 is therefore obtained by taking only the component with absolute frequency values in a vicinity of Fc from among the frequency components of the input image DIN. The first intermediate image generating means 1 thus has the effect of generating the first intermediate image D1 by taking only a component with absolute frequency values in a vicinity of Fc from among the frequency components of the input image DIN. In other words, the component taken and placed in the first intermediate image D1 is a frequency component that is slightly weakened by the low-frequency component passing means U11A.

Figure 23A:
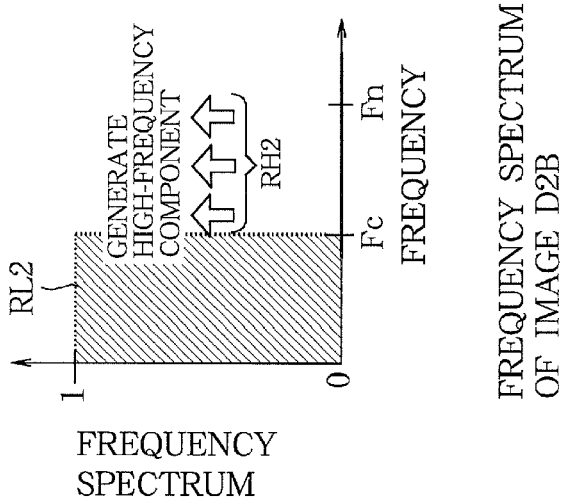
FIGS. 23(A) to 23(C) are diagrams showing frequency spectra and frequency responses to illustrate the operation of the second intermediate image generating means 2 in the third embodiment.
Figure 23B:
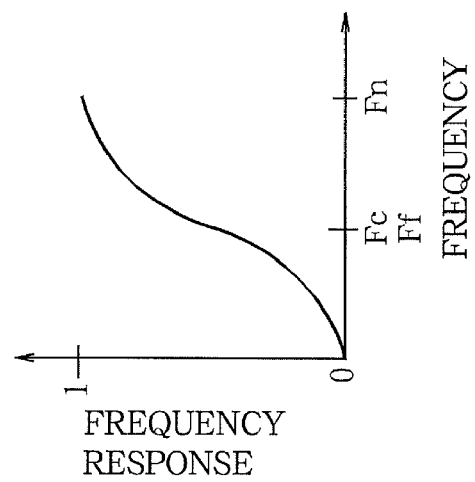
Figure 23C:
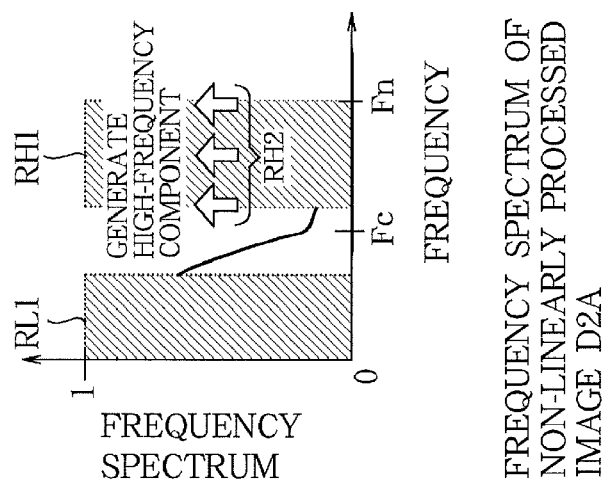

FIGS. 23(A) to 23(C) are diagrams representing the effect of the second intermediate image generating means 2: FIG. 23(A) represents the frequency spectrum of the non-linearly processed image D2A; FIG. 23(B) represents the frequency response of high-frequency component image generating means 2B; FIG. 23(C) represents the frequency spectrum of image D2B. FIGS. 23(A) to 23(C) represent the frequency spectra and frequency response only in the range where the spatial frequency is 0 or greater, for the same reason as in FIGS. 22(A) to 22(E).

A high-frequency component corresponding to the high-frequency region RH2 is generated in non-linearly processed image D2A, as described later. FIG. 23(A) expresses this schematically. The image D2B shown in FIG. 23(C) is generated by passing the non-linearly processed image D2A through high-frequency component image generating means 2B. High-frequency component image generating means 2B includes a high-pass filter that passes components equal to or greater than a third frequency Ff, and its frequency response increases as the frequency increases as shown in FIG. 23(B). Accordingly, the frequency spectrum of image D2B is obtained by removing a component (with frequencies lower than the third frequency Ff) corresponding to the low-frequency region RL2 from the frequency spectrum of the non-linearly processed image D2A, as shown in FIG. 23(C). In other words, the non-linear processing means 2A has the effect of generating a high-frequency component corresponding to the high-frequency region RH2, and high-frequency component image generating means 2B has the effect of extracting only the high-frequency component generated by the non-linear processing means 2A. In the illustrated example, the third frequency Ff is equal to Fc.

The above effects will now be described in further detail.

FIGS. 24(A) to 24(E) are diagrams illustrating signals obtained when a step edge is sampled, and signals obtained by performing high-pass filtering on those signals.

Figure 24A:
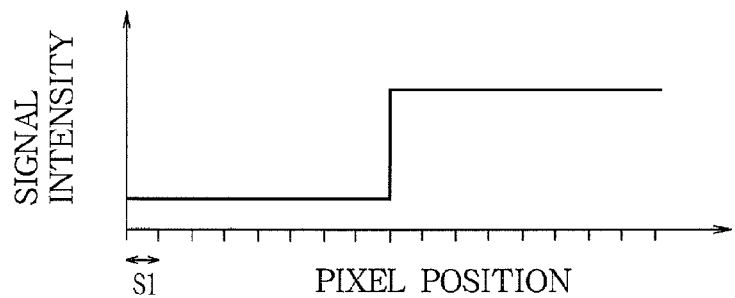
FIGS. 24(A) to 24(E) are diagrams illustrating signals obtained when a step edge is sampled and signals obtained when the step edge is filtered.
Figure 24B:
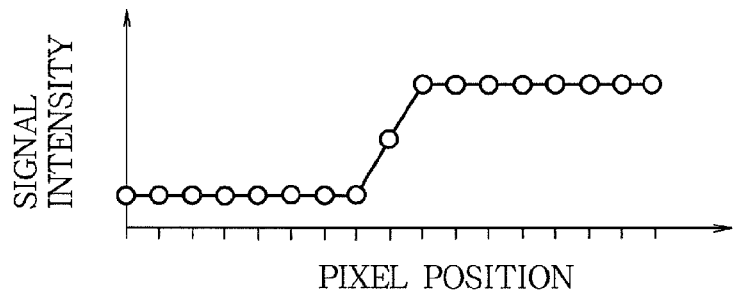
Figure 24C:
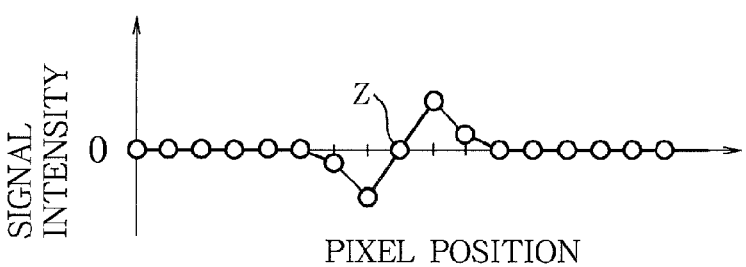
Figure 24D:
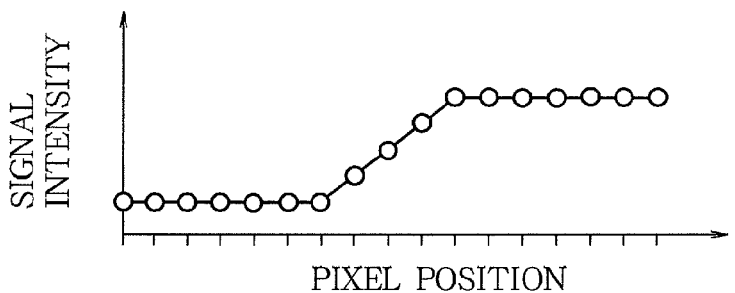
Figure 24E:
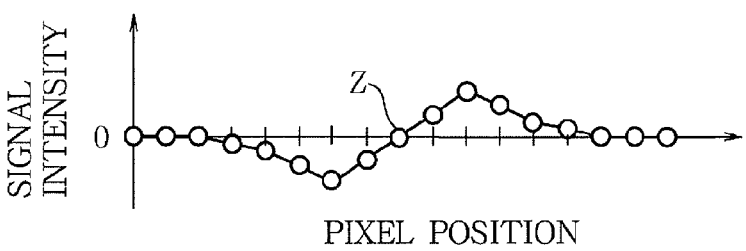

FIG. 24(A) shows a step edge and a sampling interval S1; FIG. 24(B) shows the signal obtained when the step edge is sampled with sampling interval S1; FIG. 24(C) shows the high-frequency component of the signal shown in FIG. 24(B). FIG. 24(D) represents a signal in which a high-pass filtering process has been applied to the signal shown in FIG. 24(B); FIG. 24(E) represents the high-frequency component of the signal represented in FIG. 24(D).

A comparison of FIGS. 24(B) and 24(D) shows that in FIG. 24(D) the signal changes more gradually (or the gradient of the brightness change is smaller) in the vicinity of the step edge. When the signal changes in the vicinities of step edges become more gradual in this way, perceived image resolution is lost. In other words, if low-pass filtering is applied to step edges by the noise eliminating means U11, the signal changes in the vicinities of step edges become more gradual and perceived resolution is lost.

As shown in FIGS. 24(C) and 24(E), however, a zero-crossing point Z appears in the signal representing the high-frequency component at the center of the step edge. The gradient of the signals representing the high-frequency component in the vicinity of the zero-crossing point Z is steeper in FIG. 24(C), in which the low-pass filtering process has not been carried out, and the points giving the local maximum and minimum values near the zero-crossing point Z are closer to the zero-crossing point Z when the low-pass filtering process is not applied.

Thus in the vicinity of an edge, the position of the zero-crossing point Z in the signals representing the high-frequency component does not change, but when a low-pass filtering process is applied and the perceived resolution is reduced, the gradient of the high-frequency component near the edge becomes more gradual, and the positions of the points giving the local maximum and minimum values retreat from the zero-crossing point Z.

FIGS. 25(A) to 25(E) are diagrams illustrating operations and effects when a step edge that has undergone a low-pass filtering process in the low-frequency component passing means U11A is input to the enhancement processing means U12 in FIG. 20, in particular the operation of the first intermediate image generating means 1 and second intermediate image generating means 2. As explained above, the processing in the first intermediate image generating means 1 and second intermediate image generating means 2 is carried out in the horizontal direction and vertical direction separately, so it is carried out one-dimensionally. The content of the processing is therefore represented using one-dimensional signals in FIGS. 25(A) to 25(E).

FIG. 24(A) shows a signal in which a low-pass filtering process has been applied to a signal obtained by sampling a step edge similar to the one in FIG. 24(D); this type of filtered signal is obtained as the output DU11 of the noise eliminating means U11 in FIG. 20.

Figure 25A:
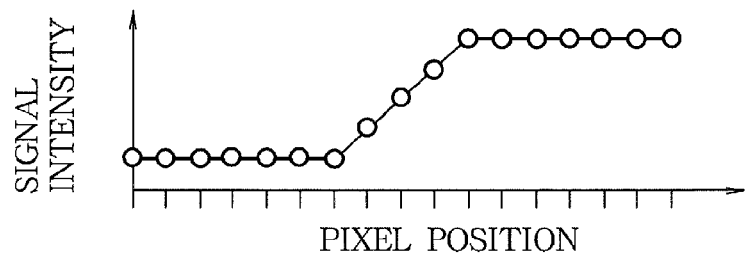
FIGS. 25(A) to 25(E) are diagrams showing signals in different parts of the first intermediate image generating means 1 and second intermediate image generating means 2 in the third embodiment.
Figure 25B:
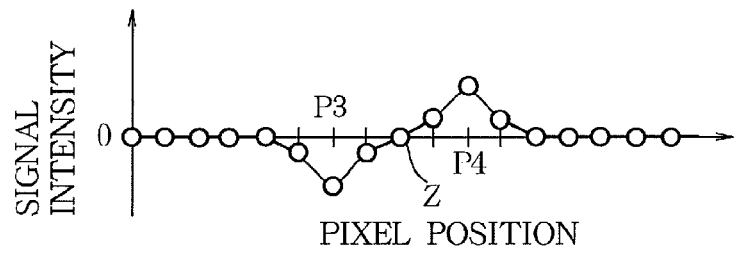

FIG. 25(B) shows a signal representing the high-frequency component of the signal (DU11) shown in FIG. 25(A), thus corresponding to the image D1A output from high-frequency component image generating means 1A. The coordinates of the points giving the local minimum and maximum values near the zero-crossing point Z of the signal equivalent to image D1A are shown as P3 and P4.

Figure 25C:
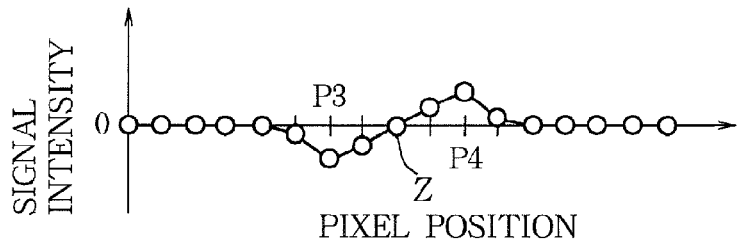

FIG. 25(C) is a signal representing the low-frequency component of the signal shown in FIG. 25(B), thus corresponding to the image D1B output from the low-frequency component image generating means 1B. As stated above, image D1B is output as the first intermediate image D1, so FIG. 25(C) is also equivalent to the first intermediate image D1. In FIG. 25(C) as well, the local minimum value in the vicinity of the zero-crossing point Z in the first intermediate image D1 appears at coordinate P3, and the local maximum value appears at coordinate P4, as shown in FIG. 25(E), matching the high-frequency component taken from the signal obtained by sampling the step edge with sampling frequency S2.

Figure 25D:
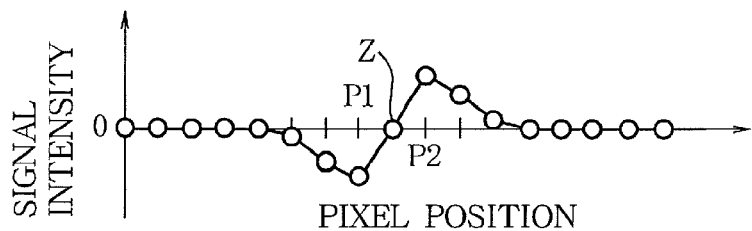

FIG. 25(D) represents the output signal of the non-linear processing means 2A for the signal represented in FIG. 25(C), that is, the image D2A output from the non-linear processing means 2A in response to input of the first intermediate image D1. The signal values at the coordinates P1 and P2 preceding and following the zero-crossing point Z are amplified by the non-linear processing means 2A. The magnitude of the signal values at coordinates P1 and P2 is therefore greater than the other values in image D2A, as shown in FIG. 25(D), and the position at which the local minimum value appears moves to coordinate P1, closer to the zero-crossing point Z than coordinate P3, while the position at which the local maximum value appears moves to coordinate P2, closer to the zero-crossing point Z than coordinate P4. This signifies that a high-frequency component has been generated by the non-linear processing that amplifies the values of the pixels preceding and following the zero-crossing point Z. Thus it is possible to generate a high-frequency component by changing the amplification factor adaptively at each pixel, or by appropriately changing the content of the processing from pixel to pixel. The non-linear processing means 2A accordingly has the effect of generating a high-frequency component not included in the first intermediate image D1, namely a high-frequency component corresponding to region RH2 on the high-frequency side.

Figure 25E:
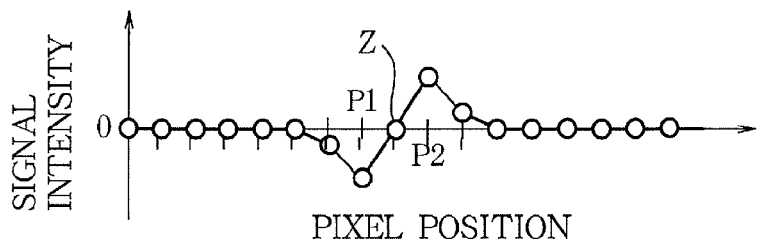

FIG. 25(E) is a signal representing the high-frequency component of the signal represented in FIG. 25(D), thus corresponding to the image D2B output from high-frequency component image generating means 2B. As shown in FIG. 25(E), a local minimum value appears at coordinate P1 in the vicinity of the zero-crossing point Z and a local maximum value appears at coordinate P2, matching the appearance of the high-frequency component shown in FIG. 24(C), taken from the signal in which the step edge was sampled with sampling interval S1. This means that the high-frequency component generated by the non-linear processing means 2A has been extracted by high-frequency component image generating means 2B and output as image D2B. It could also be said that the extracted image D2B is a signal that includes a frequency component corresponding to the signal in which the step edge was sampled with sampling interval S1. In other words, high-frequency component image generating means 2B has the effect of extracting the component with absolute frequency values greater than Fc from the high-frequency component generated by the non-linear processing means 2A.

The first intermediate image D1 and second intermediate image D2 are added to the input image DIN by the adding means 4.

As stated above, a component is extracted from the original image DORG by taking the component with absolute frequency values in a region in a vicinity of Fc, after the high-frequency component of the original image DORG has been weakened by the low-frequency component passing means U11A, and corresponds to the component with absolute frequency values near Fc, as shown in FIG. 22(E). As explained in FIG. 21(B), the spectral intensity of the band with absolute frequency values near Fc is weakened by processing in the noise eliminating means U11, so the addition of the first intermediate image D1 can compensate for the weakening of the spectral intensity in the noise eliminating means U11. The second intermediate image D2, however, which is identical to image D2B, is a high-frequency component corresponding to the spectral component with absolute frequency values greater than Fc. The addition of the second intermediate image D2 can accordingly supply a high-frequency component in the band in which the absolute frequency value is greater than Fc. The spectral intensity in the band in which the absolute frequency value is greater than Fc is also weakened by processing in the noise eliminating means U11, so the addition of the second intermediate image D2 can compensate for the weakening of the spectral intensity by the noise eliminating means U11. To summarize the above, by adding the first intermediate image D1 and second intermediate image D2 to the input image DIN, it is possible to add a high-frequency component that was weakened or lost in the noise eliminating means U11. In other words, the perceived image resolution can be increased by the enhancement processing means U12 even though a lowering of the perceived image resolution occurs in the noise eliminating means U11.

In addition, in the enhancement processing means U12, the first intermediate image generating means 1 and the second intermediate image generating means 2 perform image processing in the horizontal direction and the vertical direction in parallel, so the effects described above can be obtained not just in the horizontal or vertical direction but in any direction.

To summarize the above, in the image processing apparatus in the third embodiment, noise can be eliminated in the noise eliminating means U11, so even if enhancement processing is carried out in the enhancement processing means U12, the noise is not enhanced. Since the enhancement processing means U12 includes the non-linear processing means 2A, it is possible to add a high-frequency component that was weakened by the noise eliminating means U11, and the perceived image resolution can be increased by the enhancement processing means U12 even if a lowering of the perceived image resolution occurs in the noise eliminating means U11. In other words, image enhancement processing is possible without enhancing noise, and the lowering of perceived resolution that accompanies noise elimination does not occur.

The noise eliminating means U11 only has to eliminate noise by the use of a low-pass filter. A configuration may be considered in which a circuit is provided for estimating the amount of noise included in the original image DORG, and the low-pass filtering process in the low-frequency component passing means U11A can be controlled locally according to the output result of this circuit. An edge-preserving filter such as an E filter also eliminates noise by the use of a low-pass filter, and may be used as the noise eliminating means U11.

A configuration in which the image processing apparatus in the first embodiment is used as the enhancement processing means U12 has been described, but the image processing apparatus in the second embodiment may also be used as the enhancement processing means U12, with similar effects.

Figure 26:
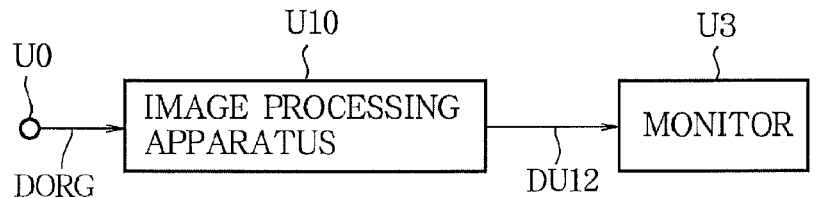
FIG. 26 is a block diagram illustrating an exemplary structure of an image display apparatus equipped with the image processing apparatus in FIG. 20.

The image processing apparatus U10 in the third embodiment may be used as part of an image display apparatus as shown in FIG. 26. In one contemplated usage, for example, the image input from the input terminal U0 is input to the image processing apparatus U10 according to the third embodiment as the original image DORG, and the output image DU12 of the image processing apparatus U10 is displayed on the monitor U3.

Fourth Embodiment

Figure 27:
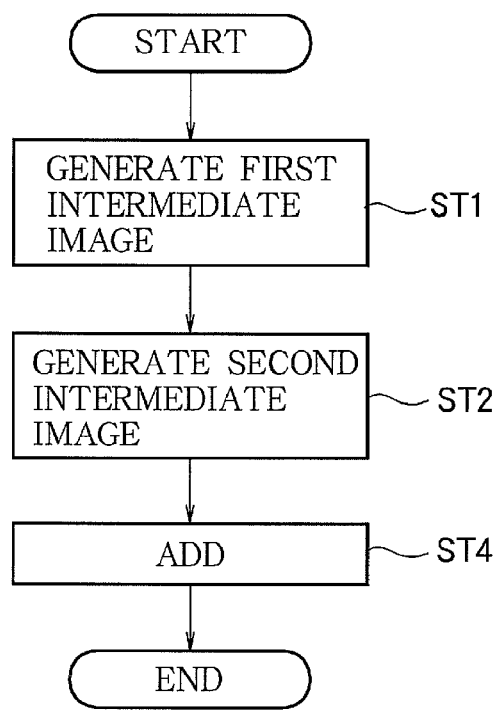
FIG. 27 is a flowchart illustrating processing steps in an image processing method according to a fourth embodiment of the invention.

FIG. 27 is a flowchart illustrating an image processing method according to a fourth embodiment of the invention; the image processing method according to a fourth embodiment includes a first intermediate image generating step ST1, a second intermediate image processing step ST2, and an adding step ST3.

Figure 28:
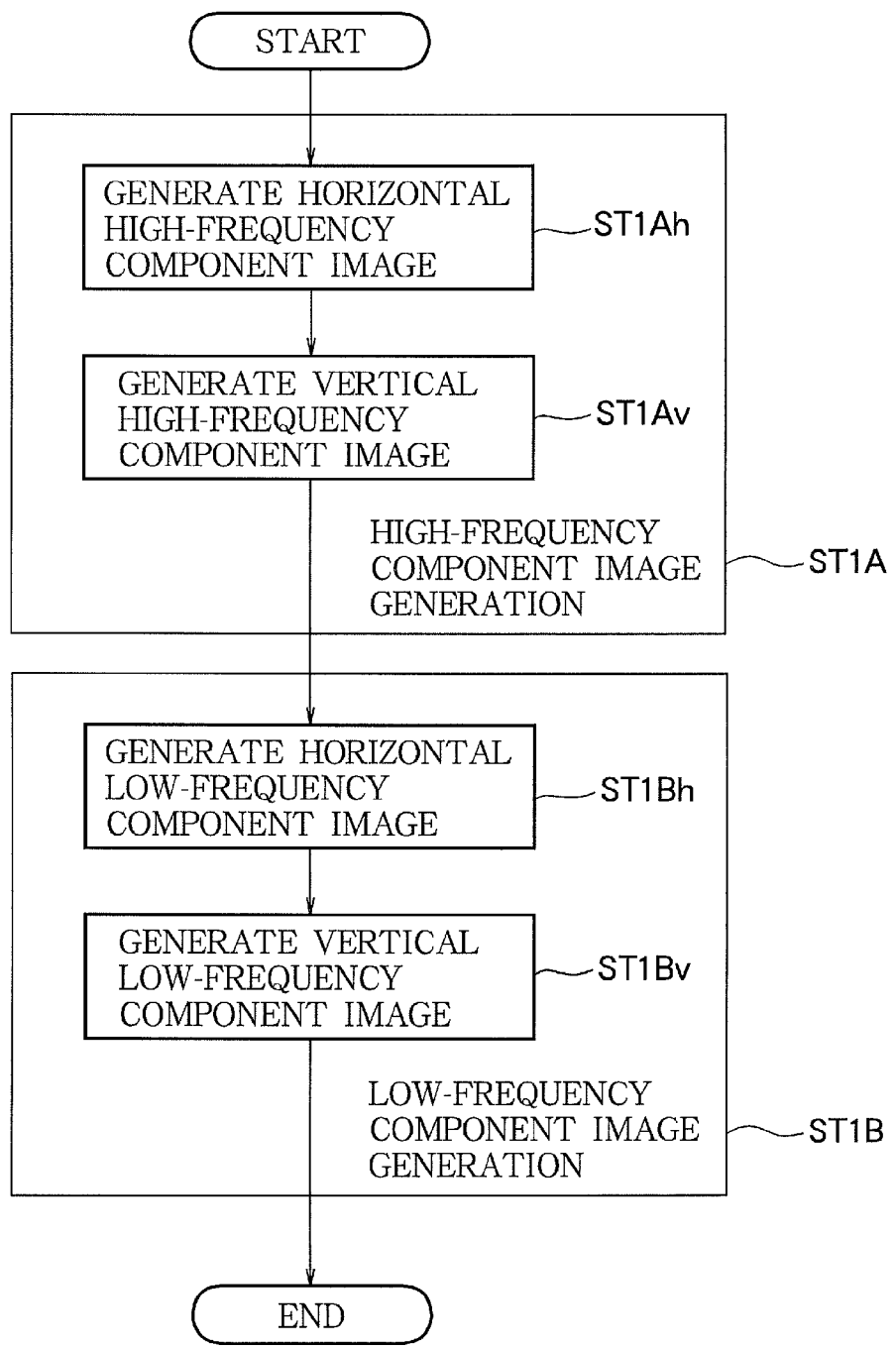
FIG. 28 is a flowchart illustrating processing in the intermediate image generating step ST1 in FIG. 27.

The intermediate image generating step ST1 includes, as shown in FIG. 28, a high-frequency component image generating step ST1A and a low-frequency component image generating step ST1B.

The high-frequency component image generating step ST1A includes a horizontal high-frequency component image generating step ST1Ah and a vertical high-frequency component image generating step ST1Av, and the low-frequency component image generating step ST1B includes a horizontal low-frequency component image generating step ST1Bh and a vertical low-frequency component image generating step ST1Bv.

Figure 29:
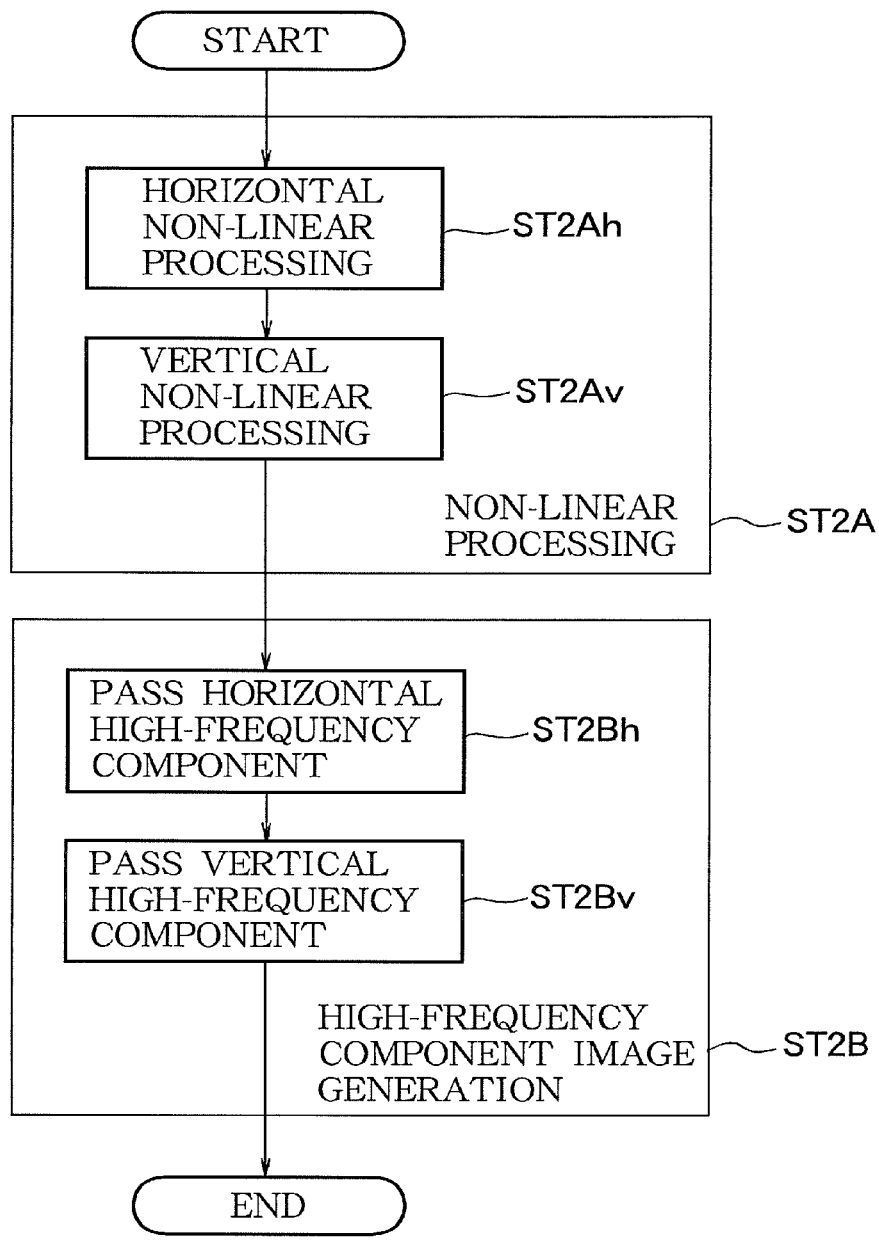
FIG. 29 is a flowchart illustrating processing in the intermediate image generating step ST2 in FIG. 27.

The intermediate image processing step ST2 includes, as shown in FIG. 29, a non-linear processing step ST2A and a high-frequency component image generating step ST2B.

The non-linear processing step ST2A includes a horizontal non-linear processing step ST2Ah and a vertical non-linear processing step ST2Av, and the high-frequency component image generating step ST2B includes a horizontal high-frequency component passing step ST2Bh and a vertical high-frequency component passing step ST2Bv.

Figure 30:
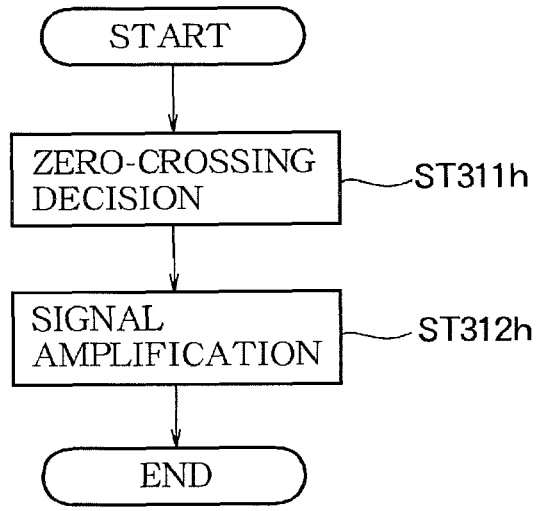
FIG. 30 is a flowchart illustrating processing in the horizontal non-linear processing step ST2A$h$ in FIG. 29.
Figure 31:
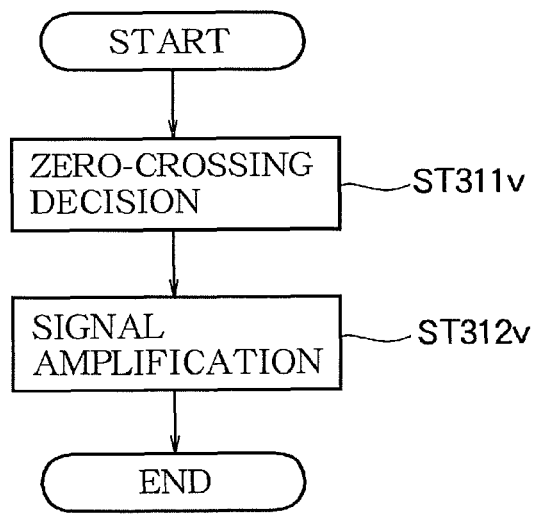
FIG. 31 is a flowchart illustrating processing in the vertical non-linear processing step ST2A$v$ in FIG. 29.

The horizontal nonlinear processing step ST2Ah includes, as shown in FIG. 30, a zero-crossing decision step ST311$h$ and a signal amplifying step ST312$h$, and the vertical nonlinear processing step ST2Av includes, as shown in FIG. 31, a zero-crossing decision step ST311$v$ and a signal amplifying step ST312$v$.

First the operation of the intermediate image generating step ST1 will be described with reference to the flowchart in FIG. 28.

In high-frequency component image generating step ST1A, the following processing is performed on an input image DIN input in an image input step, which is not shown. First, in the horizontal high-frequency component image generating step ST1Ah, a horizontal high-pass filtering process is performed to generate an image D1Ah by extracting a horizontal high-frequency component from the input image DIN. In the vertical high-frequency component image generating step ST1Av, a vertical high-pass filtering process is performed to generate an image D1Av by extracting a vertical high-frequency component from the input image DIN. High-frequency component image generating step ST1A thus performs the same processing as high-frequency component image generating means 1A to generate an image D1A including image D1Ah and image D1Av from the input image DIN. This operation is equivalent to the operation performed by high-frequency component image generating means 1A.

In the low-frequency component image generating step ST1B, the following processing is performed on image D1A. First, in the horizontal low-frequency component image generating step ST1Bh, a horizontal low-pass filtering process is performed to generate an image D1Bh by extracting horizontal a low-frequency component from image D1Ah. In the vertical low-frequency component image generating step ST1Bv, a vertical low-pass filtering process is performed to generate an image D1Bv by extracting a vertical low-frequency component from image D1Av. In this way, the low-frequency component image generating step ST1B performs the same processing as the low-frequency component image generating means 1B to generate an image D1B including image D1Bh and image D1Bv from image D1A. This operation is equivalent to the operation performed by the low-frequency component image generating means 1B.

The first intermediate image generating step ST1 operates as described above, using image D1Bh as an image D1$h$, using image D1Bv as an image D1$v$, and outputting an intermediate image D1 including image D1$h$ and image D1$v$. These operations are equivalent to the operations performed by the intermediate image generating means 1.

Next, the operation of the second intermediate image processing step ST2 will be described with reference to the flowcharts in FIGS. 29 to 31.

First, in the non-linear processing step ST2A, the following processing is performed on intermediate image D1.

First, in the horizontal non-linear processing step ST2Ah, processing is performed according to the flowchart in FIG. 30 to generate an image D2Ah from image D1$h$. The processing according to the flowchart shown in FIG. 30 is as follows. The pixel values in image D1$h$ are checked for changes in the horizontal direction in zero-crossing decision step ST311$h$. A point where the pixel value changes from positive to negative or from negative to positive is identified as a zero-crossing point, and the pixels to the left and right of the zero-crossing point are reported to signal amplifying step ST312$h$. In signal amplifying step ST312$h$, the pixel values of the pixels reported as being to the left and right of the zero-crossing point are amplified in image D1$h$, which is then output as image D2Ah. That is, image D2Ah is generated in the non-linear processing step ST2Ah by performing on image D1$h$ processing similar to that performed in the horizontal non-linear processing means 2Ah.

Next, in the vertical nonlinear processing step ST2Av, processing is performed according the flowchart in FIG. 31 to generate an image D2Av from image D1$v$. The processing according to the flowchart shown in FIG. 31 is as follows. First, the pixel values in image D1$v$ are checked for changes in the vertical direction in zero-crossing decision step ST311$v$. A point where the pixel value changes from positive to negative or from negative to positive is identified as a zero-crossing point, and the pixels immediately above and below the zero-crossing point are reported to signal amplifying step ST312$v$. In signal amplifying step ST312$v$, the pixel values of the pixels reported as being immediately above and below the zero-crossing point are amplified in image D1$v$, which is then output as image D2Av. That is, image D2Av is generated in the non-linear processing step ST2Av by performing on image D1$v$ processing similar to that performed in the vertical non-linear processing means 2Av.

The non-linear processing step ST2A operates as described above to generate an image D2A including images D2Ah and D2Av. The above operations are equivalent to the operations performed by the non-linear processing means 2A.

Next, in high-frequency component image generating step ST2B, the following processing is performed on image D2A.

First, an image D2Bh is generated by performing a horizontal high-pass filtering process on image D2Ah in the horizontal high-frequency component image generating step ST2Bh. The horizontal high-frequency component image generating step ST2Bh performs processing similar to that performed in horizontal high-frequency component image generating means 2Bh.

Next, an image D2Bv is generated by performing a vertical high-pass filtering process on image D2Av in the vertical high-frequency component image generating step ST2Bv. The vertical high-frequency component image generating step ST2Bv performs processing similar to that performed in vertical high-frequency component image generating means 2Bv.

High-frequency component image generating step ST2B operates as described above to generate an image D2B including image D2Bh and image D2Bv. These operations are equivalent to the operations performed by high-frequency component image generating means 2B.

The second intermediate image processing step ST2 operates as described above to output image D2B as intermediate image D2. Intermediate image D2 is output with image D2Bh as image S2h and image D2Bv as image D2v. The operations performed are equivalent to the operation of the second intermediate image generating means 2.

In the adding step ST4, the input image DIN, intermediate image D1, and intermediate image D2 are added together to generate the output image DOUT. Since intermediate image D1 includes image D1h and image D1v, and intermediate image D2 includes image D2h and image D2v, images D1h, D1v, D2h, and D2v are all added to the input image DIN in the adding step ST4. Images D1h, D1v, D2h, and D2v may simply be added to the input image DIN, or weighted addition may be performed. The output image DOUT is output as a final output image by the image processing method in the fourth embodiment. The operation performed in the adding step ST4 is equivalent to the operation of the adding means 4.

The image processing method in the fourth embodiment operates as described above.

As is clear from the description, the image processing method in the fourth embodiment and the image processing apparatus in the first embodiment operate equivalently. The image processing method in the fourth embodiment therefore has the same effects as the image processing apparatus in the first embodiment. An image processed by the above image processing method can be displayed by the image display apparatus shown in FIG. 6.

Fifth Embodiment

Figure 32:
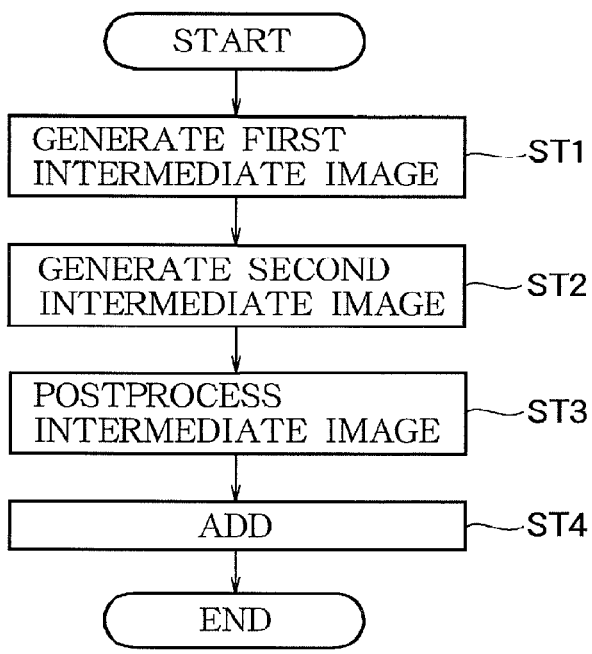
FIG. 32 is a flowchart illustrating prescribed steps in an image processing method in a fifth embodiment of the invention.

FIG. 32 illustrates the flow of an image processing method according to a fifth embodiment of the invention; the image processing method according to the fifth embodiment is generally similar to the image processing method shown in FIG. 27, but differs in that an intermediate image postprocessing step ST3 is inserted, and the adding step ST4 is modified.

The first intermediate image generating step ST1 and the second intermediate image generating step ST2 are as described in relation to the fourth embodiment.

Figure 33:
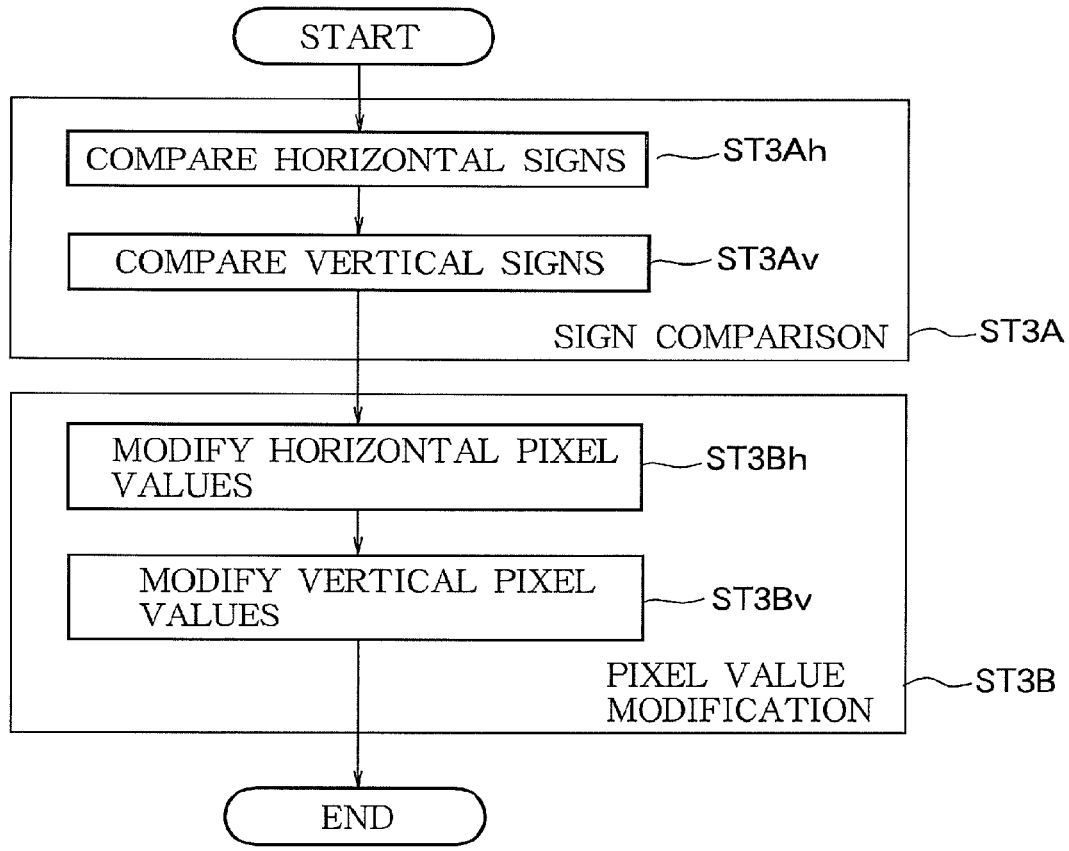
FIG. 33 is a flowchart illustrating processing in the intermediate image postprocessing step ST3 in FIG. 32.

The intermediate image postprocessing step ST3 includes a sign comparison step ST3A and a pixel value modification step ST3B, as shown in FIG. 33.

The sign comparison step ST3A includes a horizontal sign comparison step ST3Ah and a vertical sign comparison step ST3Av, and the pixel value modification step ST3B includes a horizontal pixel value modification step ST3Bh and a vertical pixel value modification step ST3Bv.

Next the operation of the intermediate image postprocessing step ST3 will be described according to the flow in FIG. 33.

First, in the sign comparison step ST3A, the signs of the pixel values of intermediate image D1 and intermediate image D2 are compared. Since intermediate image D1 includes image D1h and image D1v, and intermediate image D2 includes image D2h and image D2v, the comparison of signs is carried out on both the pixels of image D1h and image D2h and the pixels of image D1v and image D2v. The signs of the pixels of image D1h and image D2h are compared in the horizontal sign comparison step ST3Ah, and the signs of the pixels of image D1v and image D2v are compared in the vertical sign comparison step ST3Av. Signals D3Ah and D3Av are output as a signal D3A indicating the results of the comparisons.

The horizontal sign comparison step ST3Ah thus carries out processing similar to the processing performed by the horizontal sign comparing means 3Ah, obtaining a signal D3h from intermediate image D1h and intermediate image D2h. The details of the operation of the horizontal sign comparison step ST3Ah are the same as for the horizontal sign comparing means 3Ah. The vertical sign comparison step ST3Av carries out processing similar to the processing performed by the vertical sign comparing means 3Av, obtaining a signal D3v from intermediate image D1v and intermediate image D2v. The details of the operation of the vertical sign comparison step ST3Av are the same as for the vertical sign comparing means 3Av.

The pixel value modification step ST3B generates image D3B by modifying the pixel values in intermediate image D2 on the basis of signal D3A. Of the pixel values in intermediate image D2, the pixel value modifying means 3B sets the pixel values determined in the sign comparison step ST3A to differ in sign from the pixel values in intermediate image D1 to zero. When the signs match, intermediate image D2 is output without change. This process is carried out on both image D2h and image D2v. In the horizontal pixel value modification step ST3Bh, the pixel values of the pixels in image D2h that differ in sign from image D1h are set to zero to generate an image D3Bh, and in the vertical pixel value modification step ST3Bv, the pixel values of the pixels in image D2v that differ in sign from image D1v are set to zero to generate an image D3Bv. When the signs match, intermediate image D2h is output without change as intermediate image D3h in the horizontal pixel value modification step ST3Bh. Similarly, when the signs match, intermediate image D2v is output without change as intermediate image D3v in the vertical pixel value modification step ST3Bv. Image D3Bh and image D3Bv are output from the pixel value modification step ST3B as image D3B.

Image D3B is then output from the intermediate image postprocessing step ST3 as image D3. Image D3 includes an image D3h corresponding to image D3Bh and an image D3v corresponding to image D3Bv.

The intermediate image postprocessing step ST3 operates as described above. These operations are equivalent to the operations performed by the intermediate image postprocessing means 3.

In the adding step ST4, the input image DIN, intermediate image D1, and intermediate image D3 are added together to generate the output image DOUT. Since intermediate image D1 includes image D1*h* and image D1*v*, and intermediate image D3 includes image D3*h* and image D3*v*, images D1*h*, D1*v*, D3*h*, and D3*v* are all added to the input image DIN in the adding step ST4. Images D1*h*, D1*v*, D3*h*, and D3*v* may simply be added to the input image DIN, or weighted addition may be performed. The output image DOUT is output as the final output image of the image processing method in the fifth embodiment. The operations performed in the adding step ST4 are equivalent to the operation of the adding means 4.

The image processing method in the fifth embodiment operates as described above.

As is clear from the description, the image processing method in the fifth embodiment and the image processing apparatus in the second embodiment operate equivalently. Therefore, the image processing method in the fifth embodiment has the same effects as the image processing apparatus in the second embodiment. An image processed by the above image processing method can be displayed by the image display apparatus shown in FIG. 6.

Sixth Embodiment

Figure 34:
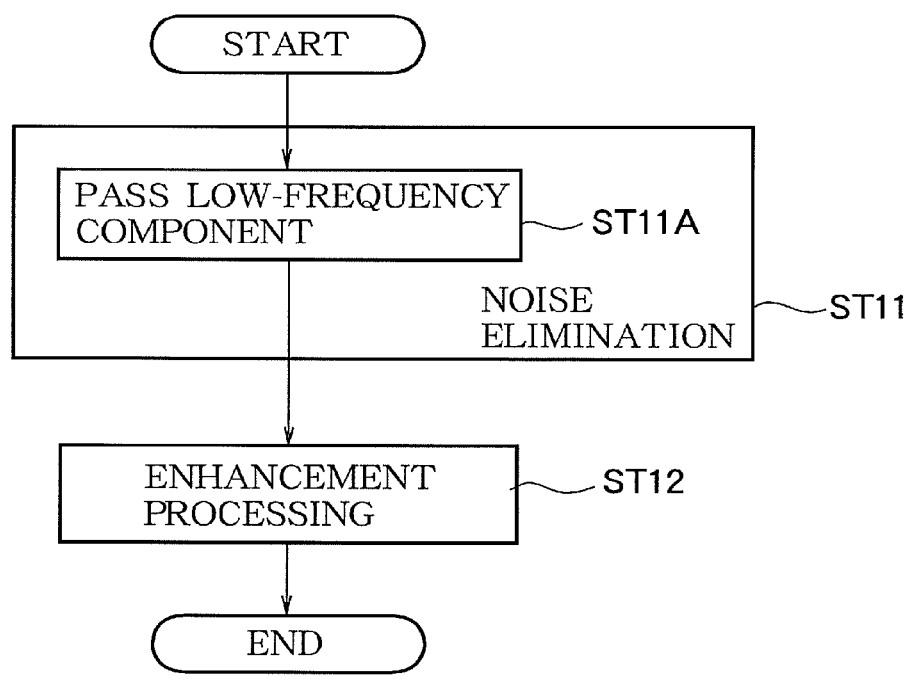
FIG. 34 is a flowchart illustrating processing steps in an image processing method in a sixth embodiment of the invention.

FIG. 34 illustrates the processing procedure in an image processing method according to a sixth embodiment of the invention; the image processing method according to the sixth embodiment includes a noise elimination step ST11 and an enhancement processing step ST12.

The noise elimination step ST11 includes a low-frequency component passing step ST11A; the low-frequency component passing step ST11A carries out noise processing by performing a low-pass filtering process on an input image DORG that is input in an image input step (not shown), and generates a noise-eliminated image DU11.

The noise elimination step ST11 operates as described above. These operations are equivalent to the operations performed by the noise eliminating means U11 in the third embodiment.

FIG. 27 illustrates the processing procedure in the enhancement processing step ST12; the image processing method in the fourth embodiment is used as the enhancement processing step ST12. The enhancement processing step ST12 thus includes a first intermediate image generating step ST1, a second intermediate image generating step ST2, and an adding step ST4.

The first intermediate image generating step ST1 and second intermediate image generating step ST2 are as described in relation to the fourth embodiment. The noise-eliminated image DU11, however, is processed as the input image DIN.

In the adding step ST4, the noise-eliminated image DU11, the first intermediate image D1, and the second intermediate image D2 are added together to generate the output image DOUT. The output image DOUT is output as a final output image by the image processing method in the sixth embodiment. The operation performed in the adding step ST4 is equivalent to the operation of the adding means 4.

The enhancement processing step ST12 operates as described above, operating equivalently to the enhancement processing means U12.

The image processing method in the sixth embodiment operates as described above. These operations are equivalent to the operations performed by the image processing apparatus described in the third embodiment.

As is clear from the description of the operation of the image processing method in the sixth embodiment, it operates equivalently to the image processing apparatus in the third embodiment. The image processing method in the sixth embodiment accordingly has the same effects as the image processing apparatus in the third embodiment.

In the above description the image processing method in the fourth embodiment is used as the enhancement processing step ST12, but the image processing method in the fifth embodiment may be used as the enhancement processing step ST12, with similar effects.

The image processing method in the sixth embodiment may be used as an image display method or as part of an image display method. For example, the image DU12 processed by the image processing method in the sixth embodiment may be generated in the image processing apparatus 10 shown in FIG. 26.

Part or all of the processing of the image processing methods in the fourth to sixth embodiments may be carried out by software, that is, by a programmed computer. An exemplary image processing apparatus for that purpose is shown in FIG. 35.

Figure 35:
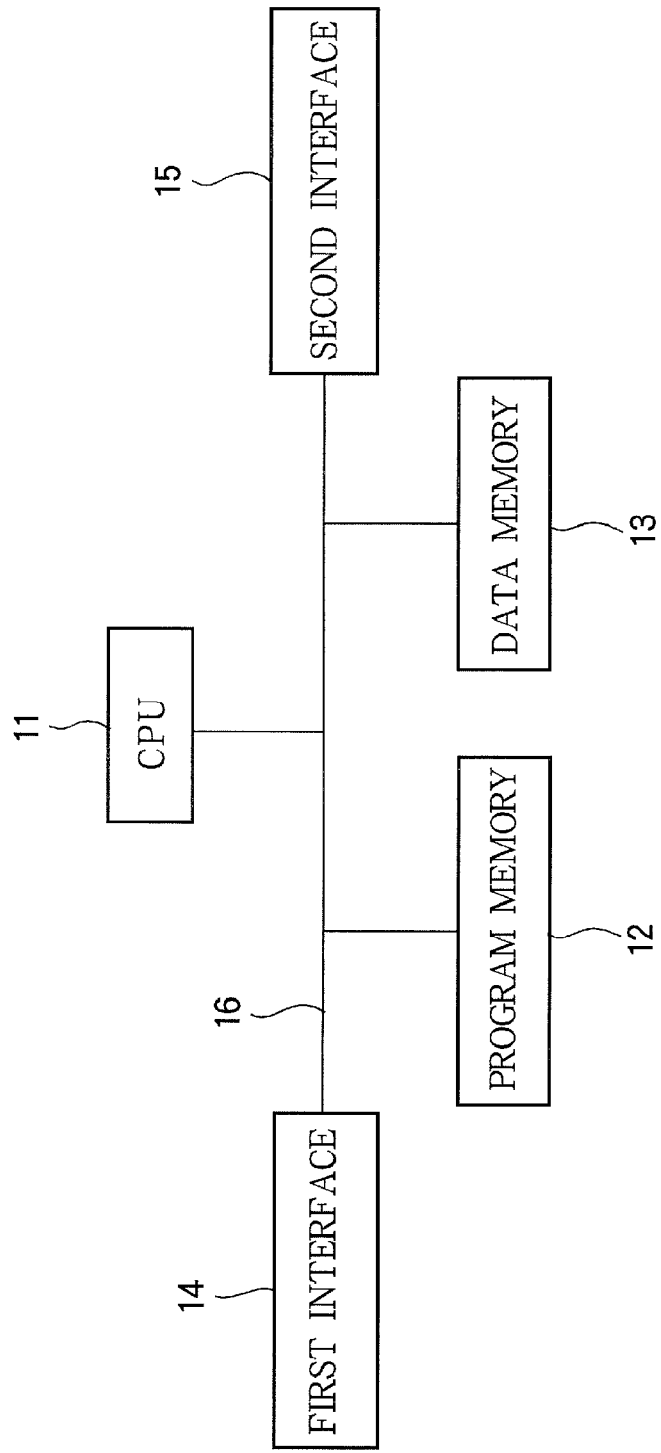
FIG. 35 is a block diagram illustrating an exemplary structure of an image processing apparatus that may be used to implement the image processing methods in the fourth to sixth embodiments of the invention.

The image processing apparatus shown in FIG. 35 includes a CPU 11, a program memory 12, a data memory 13, a first interface 14, and a second interface 15, and a bus 16 for interconnecting these components, and can be used as the image processing apparatus U2 in the display apparatus illustrated in FIG. 6, for example, in place of the image processing apparatus illustrated in FIG. 1 or 15, for example, or as the image processing apparatus U10 in the image display apparatus illustrated in FIG. 26, for example, in place of the image processing apparatus illustrated in FIG. 20.

The CPU 11 operates in accordance with a program stored in the program memory 12, and implements the image processing methods in the fourth to sixth embodiments by carrying out the processing in the steps described with reference to FIGS. 27 to 36.

When the image processing apparatus in FIG. 35 is used as the image processing apparatus in FIG. 1 or FIG. 15, the image DU1 output from the image enlarging means U1 shown in FIG. 6, for example, is supplied as the input image DIN through the first interface 14; the CPU 11 performs the same processing as performed in the image processing apparatus in FIG. 1 or FIG. 15; the output image DOUT generated as the result of the processing is supplied as image DU2 through the second interface 15 to the monitor U3 in the image processing apparatus illustrated in FIG. 6, for example, and is used for display by the monitor U3.

When the image processing apparatus in FIG. 35 is used as the image processing apparatus in FIG. 20, the original image DORG input from the input terminal U0 in FIG. 26, for example, is supplied through the first interface 14; the CPU 11 performs the same processing as performed in the image processing apparatus in FIG. 20; the output image DU12 generated as the result of the processing is supplied through interface 15 to the monitor U3 in the image processing apparatus illustrated in FIG. 26, for example, and is used for display by the monitor U3.

EXPLANATION OF REFERENCE CHARACTERS 1 first intermediate image generating means, 2 second intermediate image generating means, 3 intermediate image postprocessing means, 4 adding means, DIN input image, D1 first intermediate image, D2 second intermediate image, D3 third intermediate image, DOUT output image, DORG original image, U11 noise eliminating means, U11A low-frequency component passing means, DU11 noise-eliminated image.

What is claimed is:

1. An image processing apparatus comprising:
   a first intermediate image generating unit configured to generate a first intermediate image by extracting a component in a vicinity of a particular frequency band in an input image;
   a second intermediate image generating unit configured to generate a second intermediate image from the first intermediate image; and
   an adding unit configured to add the input image and the second intermediate image, wherein
   the input image is an enlarged image, and
   said first intermediate image generating unit removes a low-frequency component and a high-frequency component of the input image to extract said component in the vicinity of the particular frequency.

2. The image processing apparatus of claim 1, the first intermediate image generating unit comprises:
   a first horizontal high-frequency component image generating unit configured to generate a first horizontal high-frequency component image by using pixels in a horizontal vicinity of each pixel of the input image to extract a high-frequency component of the input image; and
   a horizontal low-frequency component image generating unit configured to generate a first horizontal intermediate image by extracting only a low-frequency component of the first horizontal high-frequency component image;
   the first intermediate image includes said first horizontal intermediate image;
   said second intermediate image generating unit comprises:
   a horizontal zero-crossing point decision unit configured to identify a point in the first horizontal intermediate image where pixel values change from positive to negative or from negative to positive in a horizontal direction as a zero-crossing point, and
   a horizontal signal amplifying unit configured to determine an amplification factor for the pixel values of the pixels preceding and following the zero-crossing point to be a value greater than 1, and the amplification factor for the pixel values of other pixels to be 1;
   said second intermediate image generating unit generating a horizontal non-linearly processed mage by amplifying the pixel value of each pixel of the first horizontal intermediate image by said amplification factor.

3. The image processing apparatus of claim 1, the first intermediate image generating unit comprises:
   a first vertical high-frequency component image generating unit configured to generate a first vertical high-frequency component image by using pixels in a vertical vicinity of each pixel of the input image to extract a high-frequency component of the input image; and
   a vertical low-frequency component image generating unit configured to generate a first vertical intermediate image by extracting only a low-frequency component of the first vertical high-frequency component image;
   the first intermediate image includes said first vertical intermediate image;
   said second intermediate image generating unit comprises:
   a vertical zero-crossing point decision unit configured to identify a point in the first vertical intermediate image where pixel values change from positive to negative or from negative to positive in a vertical direction as a zero-crossing point, and
   a vertical signal amplifying unit configured to determine an amplification factor for the pixel values of the pixels preceding and following the zero-crossing point to be a value greater than 1, and the amplification factor for the pixel values of other pixels to be 1;
   said second intermediate image generating unit generating a vertical non-linearly processed mage by amplifying the pixel value of each pixel of the first vertical intermediate image by said amplification factor.

4. An image display apparatus for displaying an image processed by the image processing apparatus of claim 1.

5. An image processing apparatus comprising:
   a first intermediate image generating unit configured to generate a first intermediate image by extracting a component in a vicinity of a particular frequency band in an input image;
   a second intermediate image generating unit configured to generate a second intermediate image from the first intermediate image;
   an adding unit configured to add the input image and the second intermediate image; and
   an intermediate image postprocessing unit configured to modify the pixel value in the second intermediate image based on to the first intermediate image and the second intermediate image;
   wherein said intermediate image postprocessing unit includes
   a sign comparing unit configured to compare a sign of a pixel value in the first intermediate image and a sign of a pixel value in the second intermediate image; and
   a pixel value modifying unit configured to modify the pixel value in the second intermediate image according to a result of the comparison in the sign comparing unit;
   wherein said adding unit also adds the first intermediate image to said input image.

6. The image processing apparatus of claim 5, wherein when the sign comparing unit decides that the sign of the pixel value in the first intermediate image differs from the sign of the pixel value in the second intermediate value, the pixel value modifying unit changes the pixel value in the second intermediate image to zero.

7. The image processing apparatus of claim 5, wherein the input image is a noise-eliminated image obtained by eliminating noise by a noise eliminating unit including a low-frequency component passing unit configured to carry out a low-pass filtering process.

8. An image processing method comprising:
   a first intermediate image generating step of generating a first intermediate image by extracting a component in a vicinity of a particular frequency band in an input image;
   a second intermediate image generating step of generating a second intermediate image from the first intermediate image; and
   an adding step of adding the input image and the second intermediate image, wherein
   the input image is an enlarged image, and
   said first intermediate image generating step removes a low-frequency component and a high-frequency component of the input image to extract said component in the vicinity of the particular frequency.

9. The image processing method of claim 8, the first intermediate image generating step comprises:
   a first horizontal high-frequency component image generating step of generating a first horizontal high-frequency component image by using pixels in a horizontal vicinity of each pixel of the input image to extract a high-frequency component of the input image; and
   a horizontal low-frequency component image generating step of generating a first horizontal intermediate image by extracting only a low-frequency component of the first horizontal high-frequency component image;

the first intermediate image includes said first horizontal intermediate image;

said second intermediate image generating step comprises:

a horizontal zero-crossing point decision step of identifying a point in the first horizontal intermediate image where pixel values change from positive to negative or from negative to positive in a horizontal direction as a zero-crossing point, and a horizontal signal amplifying step of determining an amplification factor for the pixel values of the pixels preceding and following the zero-crossing point to be a value greater than 1, and the amplification factor for the pixel values of other pixels to be 1;

said second intermediate image generating step generating a horizontal non-linearly processed mage by amplifying the pixel value of each pixel of the first horizontal intermediate image by said amplification factor.

10. The image processing method of claim 8, the first intermediate image generating step comprises:

a first vertical high-frequency component image generating step of generating a first vertical high-frequency component image by using pixels in a vertical vicinity of each pixel of the input image to extract a high-frequency component of the input image; and a vertical low-frequency component image generating step of generating a first vertical intermediate image by extracting only a low-frequency component of the first vertical high-frequency component image;

the first intermediate image includes said first vertical intermediate image;

said second intermediate image generating step comprises:

a vertical zero-crossing point decision step of identifying a point in the first vertical intermediate image where pixel values change from positive to negative or from negative to positive in a vertical direction as a zero-crossing point, and a vertical signal amplifying step of determining an amplification factor for the pixel values of the pixels preceding and following the zero-crossing point to be a value greater than 1, and the amplification factor for the pixel values of other pixels to be 1;

said second intermediate image generating step generating a vertical non-linearly processed mage by amplifying the pixel value of each pixel of the first vertical intermediate image by said amplification factor.

11. An image display apparatus for displaying an image processed by the image processing method of claim 8.

12. An image processing method comprising:

a first intermediate image generating step of generating a first intermediate image by extracting a component in a vicinity of a particular frequency band in an input image;

a second intermediate image generating step of generating a second intermediate image from the first intermediate image; and an adding step of adding the input image; and an intermediate image postprocessing step of modifying the pixel value in the second intermediate image based on to the first intermediate image and the second intermediate image;

wherein said intermediate image postprocessing step includes a sign comparing step of comparing a sign of a pixel value in the first intermediate image and a sign of a pixel value in the second intermediate image; and a pixel value modifying step of modifying the pixel value in the second intermediate image according to a result of the comparison in the sign comparing step;

wherein said adding step also adds the first intermediate image to said input image.

13. The image processing method of claim 12, wherein when the sign comparing step decides that the sign of the pixel value in the first intermediate image differs from the sign of the pixel value in the second intermediate value, the pixel value modifying step changes the pixel value in the second intermediate image to zero.

14. The image processing method of claim 12, wherein the input image is a noise-eliminated image obtained by eliminating noise by a noise eliminating step including a low-frequency component passing step of carrying out a low-pass filtering process.

\* \* \* \* \*